US006169938B1

(12) United States Patent
Hartsell, Jr.

(10) Patent No.: US 6,169,938 B1
(45) Date of Patent: Jan. 2, 2001

(54) TRANSPONDER COMMUNICATION OF ORVR PRESENCE

(75) Inventor: Hal Craig Hartsell, Jr., Kernersville, NC (US)

(73) Assignee: Marconi Commerce Systems Inc., Greensboro, NC (US)

( * ) Notice: Under 35 U.S.C. 154(b), the term of this patent shall be extended for 0 days.

(21) Appl. No.: 09/094,999

(22) Filed: Jun. 15, 1998

Related U.S. Application Data

(63) Continuation-in-part of application No. 08/759,733, filed on Dec. 6, 1996, now Pat. No. 5,956,259.
(60) Provisional application No. 60/009,125, filed on Dec. 8, 1995.

(51) Int. Cl.$^7$ .................................................. G05D 1/02
(52) U.S. Cl. .................... 700/302; 700/282; 700/231; 700/232; 700/233; 700/237; 700/240; 141/94; 141/98; 141/198; 141/219; 210/739; 96/98
(58) Field of Search ..................... 700/302, 282, 700/237, 232, 240; 141/94, 98, 198, 219; 210/739; 96/188

(56) References Cited

U.S. PATENT DOCUMENTS

| 3,536,109 | 10/1970 | Ginsburgh et al. ............ 141/98 |
| 3,642,036 | 2/1972 | Ginsburgh et al. ............ 141/94 |
| 3,650,303 | 3/1972 | Chambers et al. ............. 141/1 |
| 3,662,924 | 5/1972 | Crandall et al. .............. 222/64 |
| 3,786,421 | 1/1974 | Wostl et al. ................. 340/149 |

(List continued on next page.)

FOREIGN PATENT DOCUMENTS

| 2 222 714 | 3/1990 | (GB). |
| 102768/2 | 10/1992 | (IL). |
| 04128186 | 4/1992 | (JP). |
| 6227597 | 8/1994 | (JP). |
| WO 94/05592 | 3/1994 | (WO). |
| WO 94/06031 | 3/1994 | (WO). |
| WO 9514612 | 6/1995 | (WO). |
| WO 95/32919 | 12/1995 | (WO). |
| WO 96/28791 | 9/1996 | (WO). |
| WO 9639351 | 12/1996 | (WO). |
| WO 97/24689 | 7/1997 | (WO). |
| 944327 | 6/1994 | (ZA). |

OTHER PUBLICATIONS

Carb—Estimated Hyudrcarbon Emissions of Phase II and Onboard Vapor Recovery Systems; Apr. 13, 1994.
Carb—Staff's Proposed Recommendation For The Adoption Of The United States Environmental Protection Agency's Vehicle Refueling Standard and Test Procedures; Apr. 27, 1994.
Micron Communications, Inc.—Meeting Notice dated Feb. 4, 1997.
SAE Meeting Notice; May 27, 1997.
SAE ORVR Task Force Meeting Agenda; May 29, 1997.

* cited by examiner

Primary Examiner—Paul P. Gordon
Assistant Examiner—Ramesh Patel
(74) Attorney, Agent, or Firm—Coats & Bennett, P.L.L.C.

(57) ABSTRACT

The present invention provides a fuel delivery system capable of controlling a fuel dispenser's vapor recovery system based on the absence or presence of an on-board vapor recovery system on the vehicle. This system includes a fuel dispenser having a vapor recovery system, a controller capable of controlling the vapor recovery system, a receiver and an antenna operating in conjunction with the receiver to receive a signal emitted from a transponder on a vehicle indicative of the absence or presence of an on-board vapor recovery system, in addition to a type of vehicle tank or characteristic thereof. When the controller determines from the transponder signal information relating to on-board vapor recovery and/or tank characteristics, the controller will control its vapor recovery system accordingly.

51 Claims, 26 Drawing Sheets

U.S. PATENT DOCUMENTS

| | | | |
|---|---|---|---|
| 3,814,148 | 6/1974 | Wostl | 141/98 |
| 4,263,945 | 4/1981 | Van Ness | 141/98 |
| 4,313,168 | 1/1982 | Stephens et al. | 364/465 |
| 4,345,146 | 8/1982 | Story et al. | 235/381 |
| 4,469,149 | 9/1984 | Walkey et al. | 141/94 |
| 4,490,798 | 12/1984 | Franks et al. | 365/550 |
| 4,532,511 | 7/1985 | Lemelson | 340/933 |
| 4,600,829 | 7/1986 | Walton | 236/439 |
| 4,711,994 | 12/1987 | Greenberg | 235/384 |
| 4,714,925 | 12/1987 | Bartlett | 340/825.55 |
| 4,728,955 | 3/1988 | Hane | 342/140 |
| 4,760,533 | 7/1988 | Bydlon | 365/465 |
| 4,804,983 | 2/1989 | Barbiaux et al. | 340/52 |
| 4,846,233 | 7/1989 | Fockens | 141/94 |
| 4,881,581 | 11/1989 | Hollerback | 141/113 |
| 4,887,578 | 12/1989 | Woodcock et al. | 23/519 |
| 4,897,642 | 1/1990 | DiLullo et al. | 340/825 |
| 4,934,419 | 6/1990 | Lamont et al. | 141/94 |
| 4,967,366 | 10/1990 | Kaehler | 365/479 |
| 5,003,472 | 3/1991 | Perrill et al. | 365/401 |
| 5,025,253 | 6/1991 | DiLullo et al. | 340/825.06 |
| 5,058,044 | 10/1991 | Stewart et al. | 364/551.01 |
| 5,070,328 | 12/1991 | Fockens | 340/825.54 |
| 5,072,380 | 12/1991 | Randleman et al. | 364/406 |
| 5,086,389 | 2/1992 | Hassett et al. | 365/401 |
| 5,128,862 | 7/1992 | Mueller | 364/405 |
| 5,131,441 | 7/1992 | Simpson et al. | 141/209 |
| 5,156,198 | 10/1992 | Hall | 141/98 |
| 5,184,309 | 2/1993 | Simpson et al. | 364/510 |
| 5,204,512 | 4/1993 | Ieki et al. | 235/382 |
| 5,204,819 | 4/1993 | Ryan | 364/465 |
| 5,217,051 | 6/1993 | Simpson et al. | 141/59 |
| 5,218,527 | 6/1993 | Ishikawa et al. | 364/405 |
| 5,238,034 | 8/1993 | Corfitsen | 141/94 |
| 5,249,612 | 10/1993 | Parks et al. | 141/219 |
| 5,249,707 | 10/1993 | Simpson et al. | 222/40 |
| 5,253,162 | 10/1993 | Hassett et al. | 364/405 |
| 5,266,925 | 11/1993 | Vercellottie et al. | 340/572 |
| 5,267,592 | 12/1993 | Kaplan et al. | 141/387 |
| 5,300,875 | 4/1994 | Tuttle | 320/20 |
| 5,302,239 | 4/1994 | Roe et al. | 156/643 |
| 5,323,150 | 6/1994 | Tuttle | 340/825.54 |
| 5,327,066 | 7/1994 | Smith | 320/2 |
| 5,327,945 | 7/1994 | Simpson et al. | 141/59 |
| 5,343,906 | 9/1994 | Tibbals, III | 141/83 |
| 5,351,187 | 9/1994 | Hassett | 364/401 |
| 5,359,522 | 10/1994 | Ryan | 365/465 |
| 5,363,889 | 11/1994 | Simpson et al. | 141/208 |
| 5,365,551 | 11/1994 | Snodgrass et al. | 375/1 |
| 5,365,984 | 11/1994 | Simpson et al. | 141/387 |
| 5,383,500 | 1/1995 | Dwars et al. | 141/98 |
| 5,392,049 | 2/1995 | Gunnarsson | 342/42 |
| 5,393,195 | 2/1995 | Corfitsen | 414/749 |
| 5,414,427 | 5/1995 | Gunarsson | 342/51 |
| 5,422,624 | 6/1995 | Smith | 340/438 |
| 5,444,742 | 8/1995 | Grabow et al. | 375/267 |
| 5,448,110 | 9/1995 | Tuttle et al. | 257/723 |
| 5,479,416 | 12/1995 | Snodgrass et al. | 371/37.1 |
| 5,485,520 | 1/1996 | Chaum et al. | 380/24 |
| 5,495,250 | 2/1996 | Ghaem et al. | 342/51 |
| 5,497,140 | 3/1996 | Tuttle | 342/51 |
| 5,499,181 | 3/1996 | Smith | 365/424 |
| 5,500,650 | 3/1996 | Snodgrass et al. | 342/42 |
| 5,505,234 | 4/1996 | Simpson et al. | 141/206 |
| 5,539,775 | 7/1996 | Tuttle et al. | 375/200 |
| 5,541,835 | 7/1996 | Dextraze et al. | 364/401 |
| 5,552,743 | 9/1996 | Manning | 327/567 |
| 5,552,789 | 9/1996 | Schuermann | 342/42 |
| 5,557,268 | 9/1996 | Hughes et al. | 340/933 |
| 5,557,780 | 9/1996 | Edwards et al. | 395/500 |
| 5,558,679 | 9/1996 | Tuttle | 29/623.1 |
| 5,562,133 | 10/1996 | Mitchell | 141/206 |
| 5,572,226 | 11/1996 | Tuttle | 343/726 |
| 5,583,850 | 12/1996 | Snodgrass et al. | 370/342 |
| 5,605,182 * | 2/1997 | Oberrecht et al. | 141/94 |
| 5,608,739 | 3/1997 | Snodgrass et al. | 371/37.1 |
| 5,609,190 | 3/1997 | Anderson et al. | 141/59 |
| 5,621,411 | 4/1997 | Hagl et al. | 342/42 |
| 5,621,412 | 4/1997 | Sharpe et al. | 342/51 |
| 5,621,913 | 4/1997 | Tuttle et al. | 455/90 |
| 5,628,351 | 5/1997 | Ramsey, Jr. et al. | 141/98 |
| 5,671,786 | 9/1997 | Corfitsen | 141/94 |
| 5,717,374 * | 2/1998 | Smith | 340/438 |
| 5,868,179 * | 2/1999 | Hartsell, Jr. | 141/198 |
| 5,871,651 * | 2/1999 | McSpadden | 210/739 |
| 5,904,756 * | 5/1999 | Fujii et al. | 96/188 |
| 5,956,259 * | 9/1999 | Hartsell, Jr. et al. | 141/198 |

TRANSPONDER COMMUNICATION OF ORVR PRESENCE

BACKGROUND OF THE INVENTION

This application is a continuation-in-part of U.S. application Ser. No. 08/759,733 filed Dec. 6, 1996, now U.S. Pat. No. 5,956,259, which claims the benefit of U.S. Provisional Application No. 60/009,125, filed Dec. 8, 1995. Each of these applications is incorporated herein by reference.

The present invention relates generally to fuel dispensers and service stations and, more particularly, to a system to effectively control the fuel dispenser's vapor recovery system depending on the presence of an on-board recovery vapor recovery (ORVR) system on the vehicle and/or the type of fuel tank design of the vehicle.

It is well-known in the art at this time to provide communications between a fuel delivery system and a vehicle. Many systems are available which are capable of recognizing a vehicle automatically and providing communications to and from the vehicle from a fuel dispenser to keep track of customer billing or automobile diagnostics. U.S. Pat. No. 5,072,380 to Randelman et al. and U.S. Pat. No. 5,557,268 to Hughes et al. are exemplary of these systems. U.S. Pat. Nos. 5,359,522 and 5,204,819 to Ryan disclose the use of two-way RF communication systems between a vehicle computer and a fuel dispenser computer. The communication systems provide automatic activation of the fuel delivery transaction, identification of the fluid container for security and billing purposes, automatic payment without use of an identification card and memorializing fluid delivery transactions. Also disclosed is a passive communication device which uses part of the transmitted energy from the fuel dispenser for power.

U.S. Pat. No. 5,383,500 to Dwars et al. discloses a system controlling the automatic refueling of vehicles in a manner allowing a customer to control the refueling procedure without exiting the vehicle. The communications system has the capability to start, monitor and finish the refueling procedure by transmitting and receiving data signals concerning the refueling procedure, such as signals which start the refueling procedure and interrupt that procedure. Communication between the vehicle and dispenser is possible through infrared, electromagnetic or acoustic wave transmission.

U.S. Pat. No. 5,343,906 to Tibbels, III discloses a communication system linking a computer of a vehicle to a computer of a fuel dispenser via an electrical or fiber optic connection. The system validates emissions by monitoring various emissions and diagnostic aspects of the vehicle, storing the information and communicating the information to a fuel dispenser. The system is capable of maintaining a record of the vehicle's fueling and emissions history.

U.S. Pat. No. 4,934,419 to LaMont et al. discloses a fuel management system where an on-board computer communicates with a fuel dispenser using fiber optics. The disclosure primarily focuses on the management of information used in the operation of fleet vehicles. U.S. Pat. No. 5,156,198 to Hall discloses the use of a common core transformer for communications between a vehicle's on-board computer and a fuel dispenser computer. The dispenser identifies the vehicle, the amount of fuel supplied to the vehicle, the vehicle mileage since the last fueling, the date of such fueling, and the time of actual use of the vehicle.

The above references are indicative of the state-of-the-art relating to communications between a vehicle and a fuel dispenser. Various communication methods are used in such communications and a variety of information ranging from fueling information and vehicle identification to a emission control and vehicle monitoring are disclosed. However, none of the references discuss or suggest controlling a fuel dispenser's vapor recovery system based on the presence of an ORVR system or the vehicle's fuel tank design.

In some areas of the country, especially in high population density regions, fuel dispensers are already required to have vapor recovery systems to remove fuel vapors expelled from the vehicle's fuel fill neck during the in-rush of fuel during the fueling operation. In addition to vapor recovery systems on fuel dispensers, various environmental regulations will require vapor recovery systems on motor vehicles in the future. As noted, these on-board vapor recovery systems are generally referred to as ORVR systems. Difficulty arises when an ORVR-equipped vehicle is refueled at a fuel dispenser having a vapor recovery system. In certain instances, the vacuum created by the respective vapor recovery systems may cause false triggering of the fuel dispenser nozzle's cut-off mechanism, in addition to wasting energy and causing additional wear and tear by redundantly operating two vapor recovery systems. Furthermore, the simultaneous running of opposing vapor recovery systems may adversely affect the ultimate goal of vapor recovery performance.

For the past several years, the California Air Resources Board has proposed various regulations to limit the amount of fuel vapor released into the atmosphere during the refueling of a motor vehicle. During a conventional or standard fueling operation, incoming fuel displaces fuel vapor from the head space of a fuel tank and out through the fill pipe into the atmosphere, if not contained and recovered. The air pollution resulting from this situation is undesirable. Currently, many fuel dispensing pumps at service stations are equipped with vapor recovery systems that collect fuel vapor expelled from the fuel tank filler pipe during the refueling operation and transfer the vapor to a fuel storage tank.

Recently, ORVR systems have been developed in which the head space in the vehicle fuel tank is vented through a charcoal-filled canister so that the vapor is adsorbed by the charcoal. Subsequently, the fuel vapors are withdrawn from the canister into the engine intake manifold for mixture and combustion with the normal fuel and air mixture.

In typical ORVR systems, a canister outlet is connected to the intake manifold of the vehicle engine through a normally closed purge valve. The canister is intermittently subjected to the intake manifold vacuum with the opening and closing of the purge valve between the canister and intake manifold. A computer which monitors various vehicle operating conditions controls the opening and closing of the purge valve to assure that the fuel mixture established by the fuel injection system is not overly enriched by the addition of fuel vapor from the canister to the mixture.

Fuel dispensing systems having vacuum-assisted vapor recovery capability which are unable to detect vehicles equipped with ORVR systems will waste energy, increase wear and tear, ingest excessive air into the underground storage tank and cause excessive pressure build-up in the underground tank due to the expanded volume of hydrocarbon-saturated air. Recognizing an ORVR system and adjusting the fuel dispenser vapor recovery system accordingly eliminates the redundancy associated with operating two vapor recovery systems for one fueling operation. The problem of incompatibility of assisted vapor recovery and ORVR was discussed in "Estimated Hydrocarbon Emissions of Phase II and On-Board Vapor Recovery Systems" dated Apr. 12, 1994, amended May 24, 1994, by the California Air Resources Board (CARB). That paper mentions the possible use of a "smart" interface nozzle to detect an ORVR vehicle and close a vapor intake valve on the nozzle when an ORVR vehicle is being filled.

Adjusting the fuel dispenser's vapor recovery system will mitigate fugitive emissions by reducing underground tank pressure. Reducing underground tank pressure minimizes the "breathing" associated with pressure differentials between the underground tank and ambient pressure levels. If the vacuum created by the fuel dispenser's vapor recovery system is not reduced or shut off, air will be pumped to the underground tank, liquid fuel will evaporate to saturate the air, and the underground tank pressure will increase to the extent that hydrocarbons are released through a pressure vacuum valve or breathing cap associated with the underground tank. Reducing the vacuum created by the fuel dispenser's vapor recovery system when an ORVR system is detected prevents the ingestion of a volume of excess air into the underground tank. Adjusting the fuel dispenser's vapor recovery system in this manner minimizes breathing losses associated with the underground tank.

Thus, there remains a need for a fuel dispensing system with a vapor recovery system having the ability to detect a vehicle having an ORVR system and adjust its vapor recovery system when an ORVR system is detected to reduce breathing losses and wear and tear, as well as conserve energy.

SUMMARY OF THE INVENTION

The present invention provides a fuel dispenser configured to receive a signal from the transponder indicative of the presence of an ORVR system and/or the type of or characteristics associated with a fuel tank on the vehicle. Depending on the sophistication of the communication link between the transponder and dispenser, the dispenser will control its vapor recovery system accordingly. If an ORVR equipped vehicle is detected, the dispenser may deactivate the dispenser's vapor recovery system or modify the vapor recovery system performance to maximize vapor recovery or retrieve only a sufficient amount of air to reduce breathing of the underground storage tank. Similarly, the transponder may send information representing characteristics of the vehicle's tank. The control system may then control the flow rate of the vapor recovery system accordingly to maximize vapor recovery.

The term "transponder" will be used throughout the rest of the description and is considered to include any remote communications unit having a transmitter and optional receiver capable of one or two-way communications in passive or active embodiments. Active devices are typically battery or vehicle powered, while passive devices are primarily powered by energy received from the dispenser's transmitted signal. In either embodiment, both the vehicle and dispenser may have various levels of processing and memory capacity. Depending on the complexity of the desired application, the transponder may emit only a single frequency or provide real-time, fuel-duplex data transfer.

The information communicated to the system may include identification indicia relating to the vehicle, the vehicle's fuel tank and/or the customer associated with the vehicle. Typically, the information includes an indication of whether the vehicle is equipped with onboard vapor recovery equipment and, if the vehicle is so equipped, the type of recovery equipment, such as mechanical seal, liquid seal with recirculation, or liquid seal without recirculation. Regardless of the onboard vapor recovery equipment or lack thereof, the transponder may transmit indicia representing the characteristic of the vehicle's tank or permitting access to the characteristic of the vehicle's tank. Such information may further include the vehicle's make, model, and year of manufacture; the type of fuel tank or fill neck; the type(s) of recommended or authorized fuel, vent placement in the fill neck (either below or above the restrictor plate); a preset vapor recovery average; and/or an algorithm or function of the vehicle's tank conditions if values such as ullage, pressure and fuel tank temperature are known. For example, a certain vehicle's fuel tank may have a known vapor recovery curve or function dependent upon time, ullage, fuel delivery rate, hydrocarbon concentration, or like variables. Based on the vapor recovery function and the variable or variables, a control system will control vapor recovery accordingly.

Typically, the transponder will send indicia representing or leading to the access of a preset vapor recovery algorithm or function associated with the particular vehicle. In most situations, tank conditions will not be known, and the vapor recovery function will maximize vapor recovery efficiencies regardless of tank pressure, temperature and ullage. For example, one vehicle may require a much higher initial vapor recovery flow rate, which tapers off drastically after an initial period while another vehicle may require a lower initial vapor recovery flow rate which tapers off gradually throughout the fueling operation. Curves for the various vehicles and vehicle tank designs may be developed and stored on or in association with the vehicle's transponder.

Such communications may be used to maximize vapor recovery efficiencies, prevent vehicle misfueling, restrict or eliminate unauthorized fueling of non-vehicular tanks or containers, allow fueling above the EPA mandated ten gallons per minute fueling limit while meeting the EPA's fuel spillage requirements, minimize fueling time and time for payment, and eliminate the use of plastic cards and pin numbers.

Additionally, the use of sophisticated information transfer will greatly increase the ability to merchandise customers on an individual basis, taking in consideration their individual purchasing history. Vehicle diagnostic information may be accessed during the fueling operation in order to communicate such information to the appropriate regulatory agencies or inform the customer of the vehicle's diagnostic status. The dispenser could be configured to download software to correct environmental control problems on a defective motor vehicle and to monitor the vehicle during subsequent fueling operations to assure that environmental control system defects have been corrected. Furthermore, the fuel dispenser may be configured to download various intelligence to the vehicle during fueling operation, such as local area map and navigation data, among other intelligent vehicle highway system (IVHS) functions. Various encryption techniques may be used to protect sensitive information during communications.

The fueling system may include multiple intelligent dispensers having card readers and displays operating under the control of or in conjunction with a central station controller having off-site communication links with point-of-sale networks, customer data bases and regulatory agencies.

Accordingly, one aspect of the present invention provides a fuel delivery system capable of controlling a fuel dispenser's vapor recovery system based on the absence or presence of an on-board vapor recovery system on the vehicle. This system includes a fuel dispenser having a vapor recovery system, a controller capable of controlling the vapor recovery system, a receiver and an antenna operating in conjunction with the receiver to receive a signal emitted from a transponder on a vehicle indicative of the absence or presence of an on-board vapor recovery system, in addition to a type of vehicle tank or characteristic thereof. When the controller determines from the transponder signal information relating to on-board vapor recovery and/or tank characteristics, the controller will control its vapor recovery system accordingly.

Such vapor recovery system control may include completely deactivating the system or modifying the system to maximize vapor recovery or reduce underground storage tank breathing loses by controlling the intake of air into the underground storage tank. More sophisticated systems may alert the fuel dispenser when the vehicle's on-board vapor recovery system fails or otherwise malfunctions. In these cases, the vapor recovery system may activate to compensate for the vehicle's vapor recovery system malfunction. Preferably, in non-onboard vapor recovery vehicles, the information about characteristics of the vehicle's tank relates to vapor recovery control guidelines to control vapor recovery. The guidelines may be stored at the vehicle, transponder, dispenser, central control system or at a remote network.

Another aspect of the present invention is to provide a fuel delivery system capable of controlling a fuel dispenser's vapor recovery system based on information received from a remote communications unit. The delivery system includes a fuel dispenser having a vapor recovery system adapted to retrieve fuel vapor expelled from the fuel tank of a vehicle. A control system is provided with the dispenser to control the vapor recovery system. Communications electronics associated with the control system are adapted to communicate with the remote communications unit of the vehicle. The control system is adapted to receive indicia from the remote communications unit through the communications electronics and control the vapor recovery system based on the received indicia. Preferably, the indicia represents the absence or presence of an onboard vapor recovery system, in addition to the type of vapor recovery system present and/or a preferred vapor recovery function for the associated vehicle fuel tank. Notably, the control system may include a dispenser controller, central site controller or a combination thereof to provide control based on the transponder indicia.

These and other aspects of the present invention will become apparent to those skilled in the art after reading the following description of the preferred embodiments when considered with the drawings.

DETAILED DESCRIPTION OF THE PREFERRED EMBODIMENTS

Figure 1:
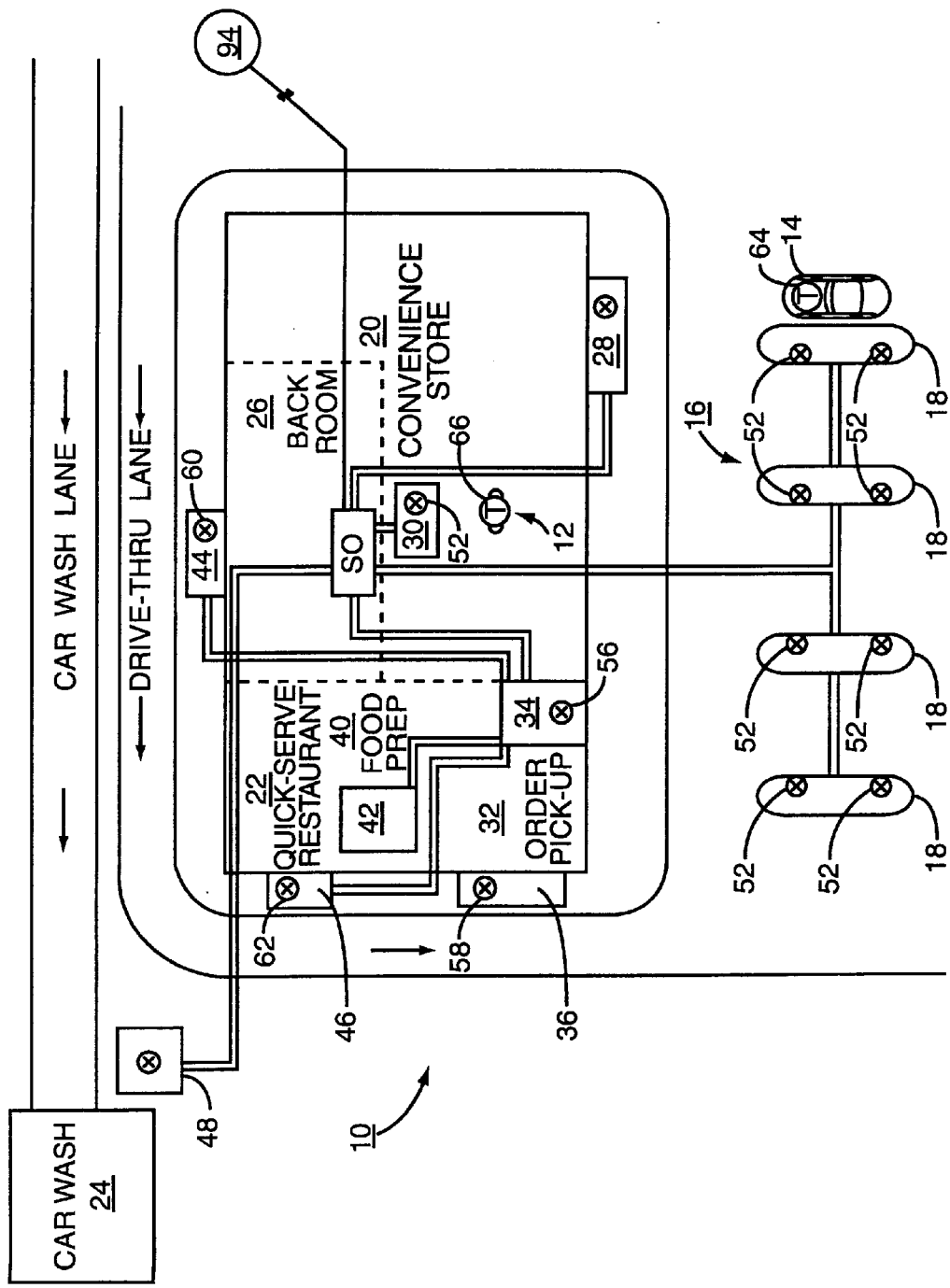
FIG. 1 is a schematic representation of a fueling and retail environment constructed according to the present invention.

In the following description, like reference characters designate like or corresponding parts throughout the several figures. It should be understood that the illustrations are for the purpose of describing preferred embodiments of the invention and are not intended to limit the invention thereto.

Given the extensive nature of the present application, an overview of the necessary hardware for the various areas in the fueling environment will be discussed followed by a description of the various functional aspects of the system and how the customer will react and interact with the system during various types of transactions.

As best seen in FIG. 1, a fueling and retail environment, generally designated 10, is shown constructed according to the present invention. The fueling and retail environment provides customers 12 the opportunity to purchase fuel for their vehicles 14 as well as other goods and services, such as fast food and car washes. The fueling and retail environment 10 may include one or more of a forecourt 16, where the fuel dispensers 18 are located, a convenience or fuel station store 20, one or more quick-serve restaurants (QSR) 22, a car wash 24, and a backroom 26. The backroom 26 is generally the central control area for integrating or coordinating control of the dispensers 18, convenience store 20, QSR 22, and car wash 24.

The convenience store 20 typically includes an inventory of a wide assortment of products, ranging from beverages and foods to household goods. The convenience store includes a transaction terminal or register 30, where a customer 12 may purchase convenience store products, fuel, car washes or QSR food.

The QSR 22 generally includes an order pick-up area 32 having a QSR transaction terminal or register 34 located within the convenience store and a drive-thru terminal and window 36. Depending on the application, the QSR transaction terminal 34 and drive-thru terminal 36 may be separated or integrated in any fashion. Usually, customers are able to place orders at the QSR transaction terminal 34 in the store as well as pick up orders in conventional drive-thru style at drive-thru terminal 36.

The QSR 22 may also include a food preparation area 40, a food preparation interface 42 for providing order instruction to QSR food preparers, a drive-thru order placement interface 44 for placing drive-thru orders in a conventional manner, and a customer position monitor 46 for determining the location or position of a customer in line to pick up a QSR order at the drive-thru window 36. Notably, the drive-thru and car wash lanes depicted in FIG. 1 are designed to control the flow of traffic through the respective lanes and aid to ensure vehicles, and their respective transponders, pass by the various interrogation points in the fueling environment as desired.

The car wash 24 includes a car wash interface 48 that interacts with the customer and controls the automatic car wash system (not shown), which may be any suitable automatic car wash. Preferably, a customer 12 will be able to order a car wash at a fuel dispenser 18, at the transaction terminal or register 30 of the convenience store 20, at the QSR transaction terminal 34, or at the car wash interface 48 directly. Similarly, customers are able to order fast-food items from the QSR 22 from various locations in the fueling environment 10, including at the fuel dispensers 18, drive-thru order placement interface 44, and the in-store QSR terminal 34.

Although various overall system and control integration schemes are available, the four major parts of the fueling environment 10—forecourt 16, convenience store 20, QSR 22 and car wash 24—typically interface at the backroom 26 using a central control system 50. The central control system 50 may include any number of individual controllers from the various parts of the fueling environment 10 to provide overall system control and integration. The central control system 50 may interface with the fuel dispensers 18, transaction terminal 30, QSR transaction terminal 34 and the car wash interface 48. Preferably the drive-thru terminal 36, drive-thru order placement interface 44 and customer position monitor 46 directly interface with the drive-thru terminal 36 in order to integrate the QSR functions prior to interfacing with the central control system 50. However, those of ordinary skill in the art will recognize several control variations capable of implementing an integrated system. Additionally, an automated vending system 28 may also interface with the central control system 50 or directly with any one of the other areas of the fueling environment 10, such as the fuel dispensers 18, in order to allow a customer 12 to purchase products from the vending system 28 at a remote location.

The present invention relates generally to providing remote communications between the vehicle 14 and the fueling environment to increase vapor recovery efficiencies and/or recognize the presence or absence of ORVR equipment. In short, many areas within the fueling environment 10 may be equipped with communication electronics capable of providing uni- or bi-directional communications with a remote communications unit of a vehicle. The communication electronics will typically include a transmitter for transmitting signals to the remote communications device and a receiver for receiving signals emanating from the remote communications device. The remote communications device may also include a receiver and transmitter. The transmitter and receiver of the remote communications device may separately receive and separately transmit signals in cooperation with an associated control system or may be configured so that the transmitter actually operates on and modifies a signal received from the communication electronics in the fueling environment 10. The latter embodiment encompasses traditional transponder-type communication systems wherein the remote communications device may be either passive or active.

For the sake of conciseness and readability, the term "transponder" will be used herein to describe any type of remote communications unit capable of communicating with the communication electronics of the fueling environment 10. The remote communications device may include traditional receivers and transmitters alone or in combination as well as traditional transponder electronics adapted to modify an original signal to provide a transmit signal. A transponder as defined herein may provide either unidirectional or bidirectional communications with the communications electronics of the fueling environment 10.

Likewise, the communication electronics associated with the various aspects of the fueling environment 10 will be called an "interrogator." An interrogator will generally include a transmitter and receiver capable of communicating with a transponder as defined above. Please note that for various aspects of the invention, an interrogator need not contain both a receiver and a transmitter.

Figure 2A:
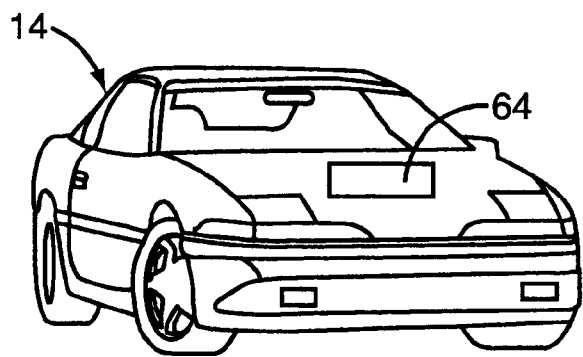
FIG. 2A depicts a vehicle having a vehicle-mounted transponder constructed according to the present invention.
Figure 2B:
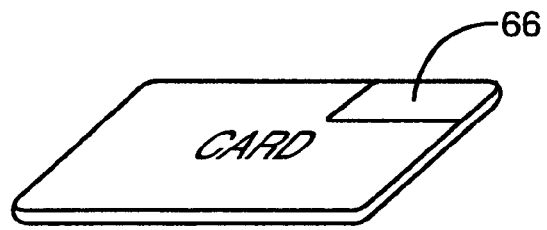
FIG. 2B depicts a personal transponder integrated into a debit/credit or smartcard constructed according to the present invention.
Figure 2C:
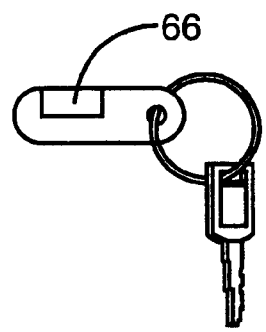
FIG. 2C depicts a personal transponder integrated into key fob constructed according to the present invention.

With the above in mind, the fueling environment 10 may include many interrogators of varying capability. These interrogators may include: dispenser interrogators 52, a store transaction interrogator 54, a QSR transaction interrogator 56, a drive-thru pick-up interrogator 58, a drive-thru order interrogator 60, and a drive-thru position interrogator 62. As shown in FIGS. 2A, 2B and 2C, the dispenser interrogator 52 is generally adapted to communicate with vehicle-mounted transponders 64 and personal transponder 66. The personal transponder 66 may be mounted on a key fob 68, a wallet card 70, or any other device typically carried by the customer 12, as shown in FIGS. 2B and 2C. FIG. 2A depicts a vehicle 14 having a vehicle-mounted transponder 64.

The levels of sophistication of the vehicle-mounted transponder 64 may vary drastically. The transponder 64 may be integrated with the vehicle's main computer and control system, or may simply be a sticker placed on a window or on another part of the vehicle. The transponder 64 may be active or passive, and may be adapted to either simply send out an identification number or carry out high-level communications and have the ability to process, store and retrieve information. The vehicle transponder 64 may cooperate with the vehicle's control system to access and transmit vehicle related data, such as ullage, fuel quantity, fuel type, tank type and tank characteristics relating to vapor recovery.

Figure 3A:
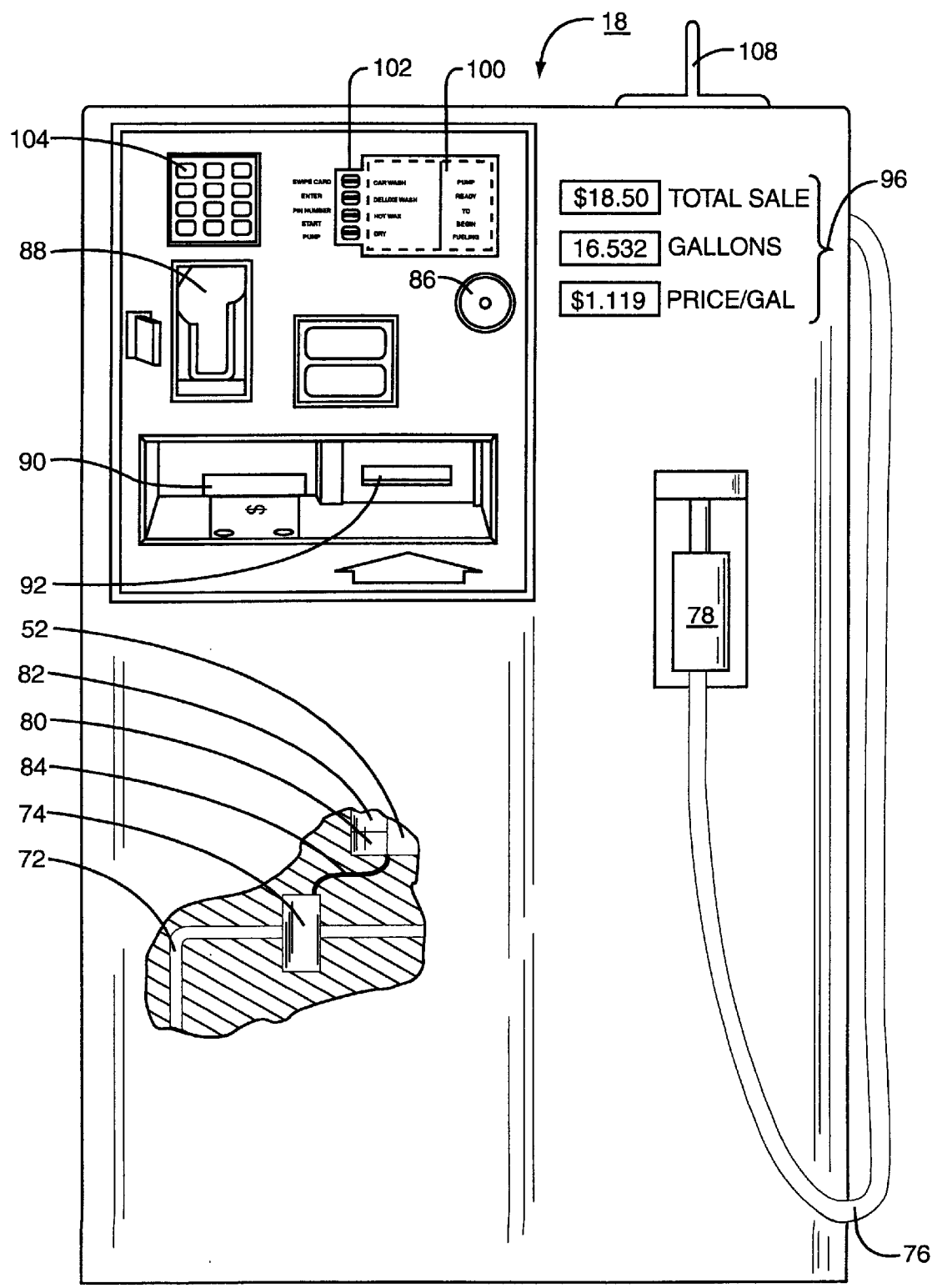
FIG. 3A is a front view of a fuel dispenser shown constructed according to the present invention.
Figure 3B:
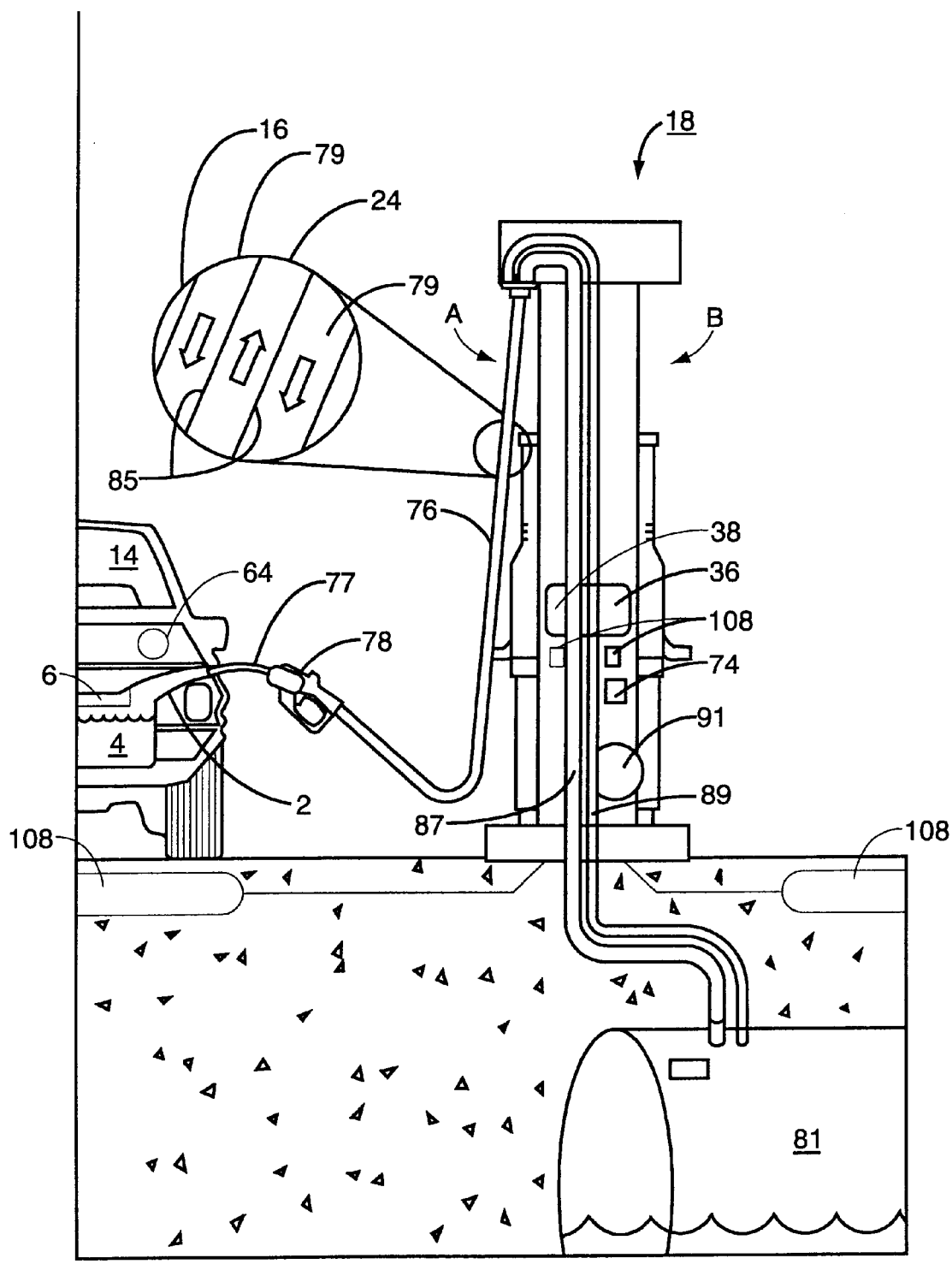
FIG. 3B is a side view of a fuel dispenser shown constructed according to the present invention.

As best seen in FIGS. 3A and 3B, in a typical service station, a vehicle 14 is shown being fueled from a gasoline dispenser 18. A spout 77 of nozzle 78 is shown inserted into a filler pipe 2 of a fuel tank 4 during the refueling of the vehicle 14. A fuel delivery hose 76 having vapor recovery capability is connected at one end to the nozzle 78, and at its other end to the fuel dispenser 18. As shown by the enlarged cutaway view of the interior of the fuel delivery hose 76 (FIG. 3B), an annular fuel delivery passageway 79 is formed within the fuel delivery hose 76 for distributing gasoline pumped from an underground storage tank 81 to the nozzle 78. Also within the fuel delivery hose 76 is a tubular vapor recovery passageway 83 for transferring fuel vapors expelled from the vehicle's fuel tank 4 to the underground storage tank 81 during the fueling of a vehicle that is not equipped with an onboard vapor recovery system. The fuel delivery hose 76 is depicted as having an internal vapor recovery hose 83 for creating the vapor recovery passage from the spout 77 to the underground storage tank 81. Inside the dispenser 18, fuel is carried to hose 76 by piping 87, and vapor is returned through piping 89.

A vapor recovery pump 91 provides a vacuum in the vapor recovery passage for removing fuel vapor during a refueling operation. The vapor recovery pump 91 may be placed anywhere along the vapor recovery passage between the nozzle 77 and the underground fuel storage tank 81. The vapor recovery system using the pump 91 may be any suitable system, such as those shown in U.S. Pat. No. 5,040,577 to Pope, U.S. Pat. No. 5,195,564 to Spalding, U.S. Pat. No. 5,333,655 to Bergamini et al., or U.S. Pat. No. 3,016,928 to Brandt. Various ones of these systems are now in commercial use recovering vapor during refueling of conventional non-ORVR vehicles. The present invention addresses an adaptation of those systems for use with both ORVR and non-ORVR equipped vehicles.

The vehicle 14 may be equipped with an ORVR system 6 to minimize the amount of fuel vapor expelled from the filler pipe 2 during fueling. Additionally, the vehicle 14 includes the transponder 64 for communicating with the dispenser 18. The transponder 64 may be as simple as a transmitter adapted only to emit a single frequency or as complex as a transceiver and controller adapted to provide fuel-duplex, real-time communications between the vehicle 14 and dispenser 18. The dispenser 18 will normally include a dispenser system 80 with associated communications electronics 52 having one or more antennas placed at various locations throughout the fueling environment. The antennas may be placed anywhere within the service station environment, such as on an overhead awning or along the perimeter of the position, or within or near the dispensers 18. Furthermore, "antenna" is used in a most generic sense and includes sensors capable of picking up numerous types of signals emitted from a vehicle transmitter or transponder 8, such as electromagnetic, acoustic, infrared and optic signals.

The dispenser control system 80 may consist of one or more controllers and an associated memory 82. The dispenser control system 80 may receive volume data from the metering device 74 in the fuel delivery path through cabling 84 as well as provide control of fuel delivery. The dispenser control system 80 may provide audible signals to an audio module and speaker 86 in order to provide various beeps, tones and audible messages to a customer. These messages may include warnings, instructions and advertising.

The dispenser 18 is preferably equipped with a payment acceptor, such as a card reader 88 or cash acceptor 90, along with a receipt printer 92. With these options, the dispenser control system 80 may read data from the magnetic strip of a card inserted in the card reader 88 or receive cash from a customer and communicate such information to the central control system 50 (as shown in FIG. 1), such as the G-site controller sold by Gilbarco Inc., 7300 West Friendly Avenue, Greensboro, N.C. The central control system 50 typically communicates with a remote network 94, such as a card verification authority, to ascertain whether a transaction proposed to be charged to or debited from an account associated with the card inserted in the card reader 88 is authorized.

The dispenser 18 will include one or more types of displays, preferably one or more alpha-numeric displays 96 together with a high-resolution graphics display 100. The graphics display 100 will generally have an associated key pad 102 adjacent to the display or integrated with the display to provide a touch interface. The dispenser may include an additional, auxiliary key pad 104 associated with the card reader 88 for entering secret codes or personal identification numbers (PIN's). Notably, the displays 96, 100 and key pads 102, 104 may be integrated into a single device and/or touch interface. The dispenser control system 80 is preferably comparable to the microprocessor-based control systems used in CRIND (card reader in dispenser) and TRIND (tag or transponder reader in dispenser) type units sold by Gilbarco Inc. under the trademark THE ADVANTAGE. For additional information relating to transponder-to-dispenser communications, please see U.S. Provisional Application Serial No. 60/060,066 filed Sep. 26, 1997, the disclosure of which is incorporated herein by reference.

As noted, the dispenser control system 80 may include or be associated with dispenser communication electronics referred to as interrogator 52 for providing remote unidirectional or bidirectional communications between a transponder and the dispenser. These transponders may incorporate the Micron Microstamp™ produced by Micron Communications, Inc., 8000 South Federal Way, Boise, Id. 83707-0006. The Micron Microstamp™ engine is an integrated system implementing a communications platform referred to as the Microstamp™ standard on a single CMOS chip. A detailed description of the Microstamp™ engine and the method of communication is provided in its data sheets in the Micron Microstamp™ Standard Programmers Reference Manual provided by Micron Communications, Inc. These references and the information provided by Micron Communications on their web site at http://www.mncc.micron.com are incorporated herein by reference. Although the preferred communications method includes radio frequencies in the microwave range, these communications may include infrared, acoustic or other known remote communication methods acceptable for use in a fueling environment. Additionally, the dispenser 18 may include one or more antennas 108 associated with the dispenser interrogator 52.

Figure 4A:
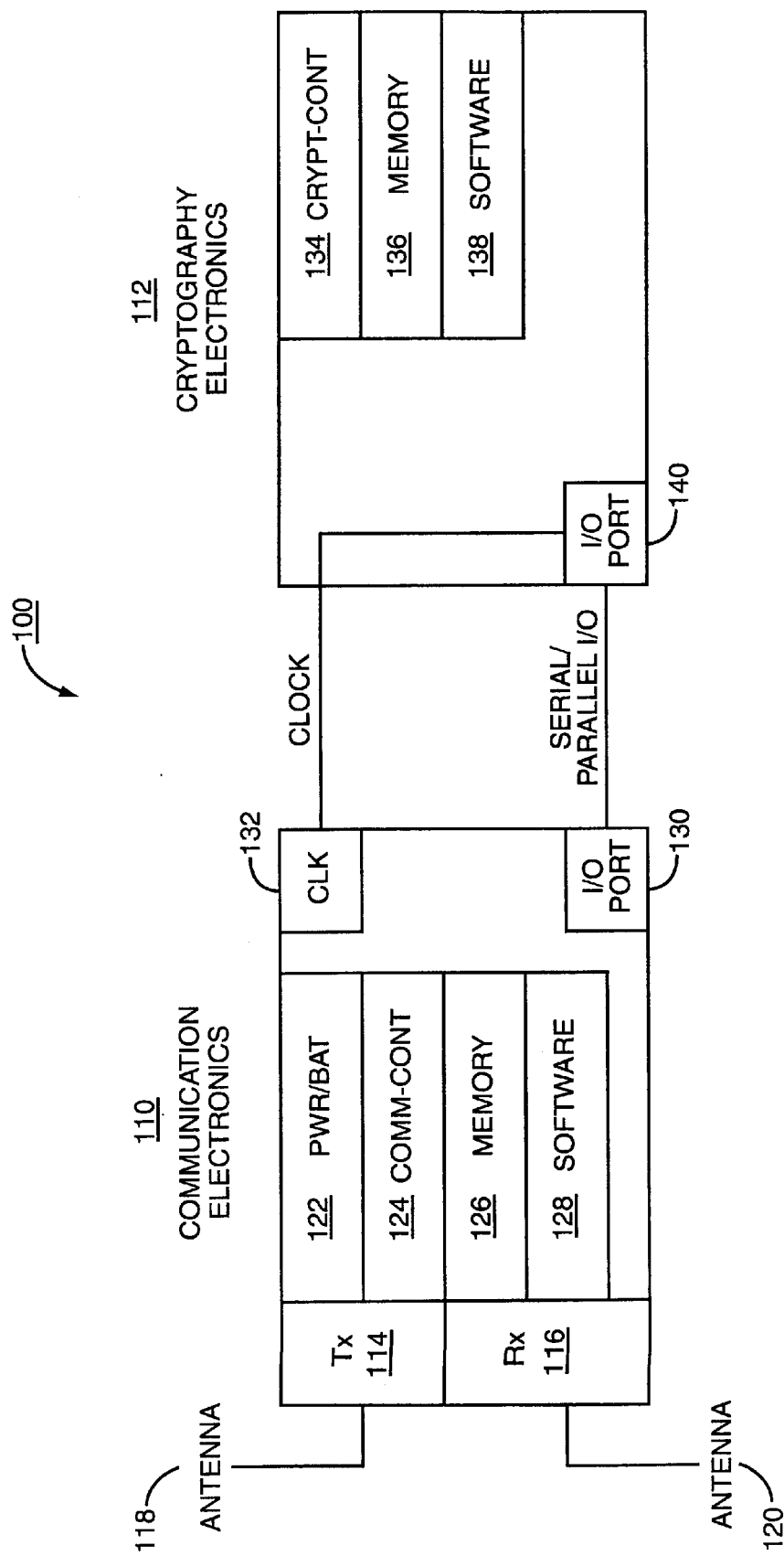
FIG. 4A is a schematic representation of a transponder having separate communication and cryptography electronics constructed according to the present invention.

Turning now to FIG. 4A, the preferred embodiment of a transponder is shown. Transponder communication electronics 110, adapted to provide remote communications with the various interrogators, include a transmitter 114 and receiver 116 having associated antennas 118, 120. The transmitter 114 and receiver 116 operate to transmit and receive data to and from an interrogator. The communication electronics 110 may include a battery power supply 122, a communication controller 124 associated with a memory 126, having software 128 necessary to operate the communication electronics 110 and optional cryptography electronics 112.

Serial communications between the communication electronics 110 and associated with the respective electronics. The communication electronics 110 provide a signal from a clock 132 to the I/O port 140 of the cryptography electronics 112. The cryptography electronics 112 include a controller 134, memory 136 and software 138 necessary to encrypt and decrypt data, as well as provide any additional operations. The memory 126, 136 may include random access memory (RAM), read only memory (ROM), or a combination thereof. Notably, the communication controller 124 and the cryptography controller 134 may be integrated into one controller. Similarly, the software and memory of the communication and cryptography modules may be integrated or embodied in hardware.

Figure 4B:
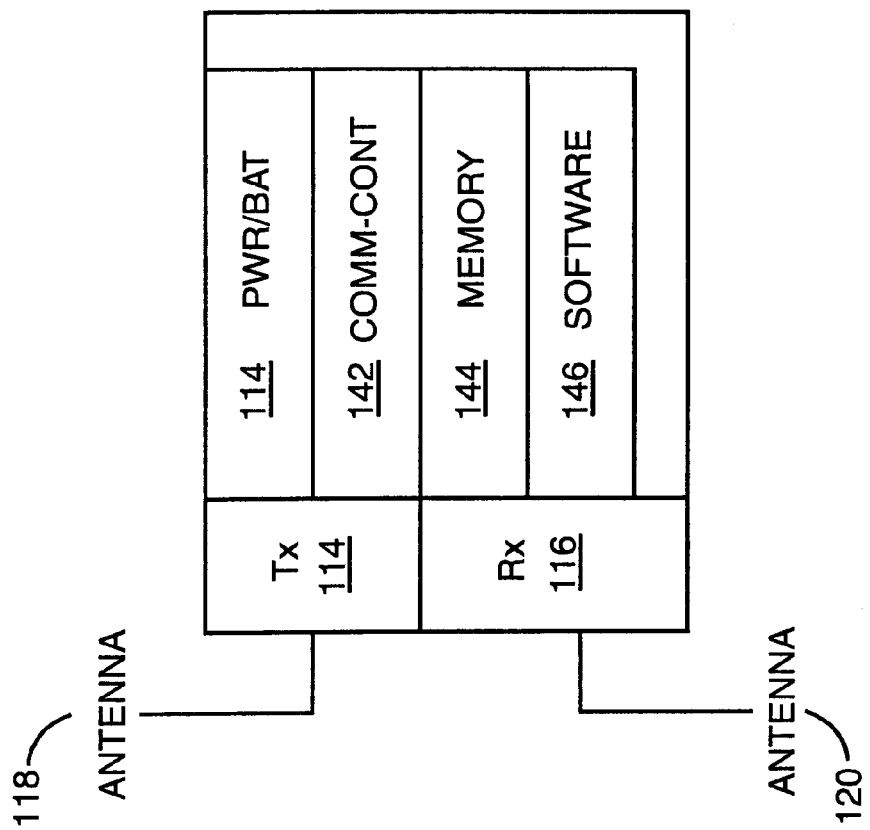
FIG. 4B is a schematic representation of transponder having integrated electronics constructed according to the present invention.

As shown in FIG. 4B, the communication and cryptography electronics, as well as any associated controllers, may be integrated into a single controller system and/or integrated circuit. In such cases, a single controller 142 is associated with memory 144 having software 146 as necessary for operation. In such an integrated system, the controller 142 will carry out any cryptography functions as well as any other functions necessary for operation.

In the preferred embodiment, the communications controller 124, 142 specifically provides a spread-spectrum processor associated with an 8-bit microcontroller. The memory 126, 144 includes 256 bytes of RAM. The receiver 116 operates in conjunction with the spread-spectrum processor and is capable of receiving direct sequence, spread-spectrum signals having a center frequency of 2.44175 GHz. The transmitter 114 is preferably a DPSK modulated back-scatter transmitter transmitting differential phase shift key (DPSK) modulated back scatter at 2.44175 GHz with a 596 KHz sub-carrier. The various interrogators in the fueling environment 10 are adapted to receive and transmit the signals to properly communicate with the transponders. For additional information on a transponder/interrogator system providing for highly secure transactions between a transponder and a host authorization system through a dispenser, attention is drawn to application Ser. No. 08/895,417 filed Jul. 16, 1997, entitled CRYPTOGRAPHY SECURITY FOR REMOTE DISPENSER TRANSACTIONS in the name of William S. Johnson, Jr.; application Ser. No. 08/895,282 filed Jul. 16, 1997, entitled MEMORY AND PASSWORD ORGANIZATION FOR REMOTE DISPENSER TRANSACTIONS in the name of William S. Johnson, Jr.; and application Ser. No. 08/895,225 filed Jul. 16, 1997, entitled PROTOCOL FOR REMOTE DISPENSER TRANSACTIONS in the name of William S. Johnson, Jr. The disclosures of these applications are incorporated herein by reference.

Figure 5:
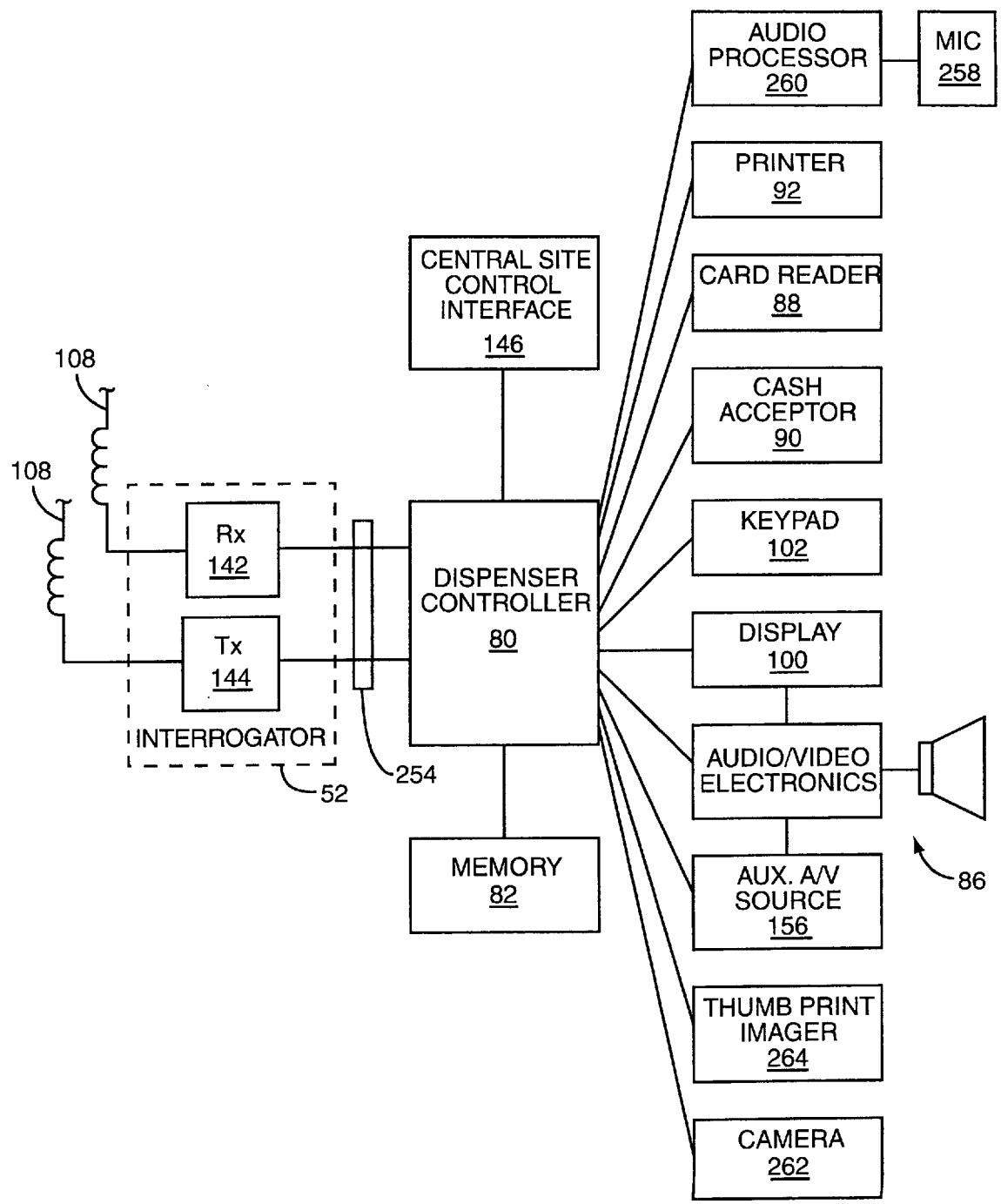
FIG. 5 is a schematic representation of fuel dispenser electronics constructed according to the present invention.

FIG. 5 shows a basic schematic overview of the dispenser electronics wherein a dispenser control system 80 includes a controller associated with the memory 82 to communicate with the central control system 50 through an interface 146. The dispenser control system 80 provides a graphical user interface with key pad 102 and display 100. Audio/video electronics 86 are adapted to interface with the dispenser control system 80 and/or an auxiliary audio/video source 156 to provide advertising, merchandising and multimedia presentations to a customer in addition to basic transaction functions.

The graphical user interface provided by the dispenser allows customers to purchase goods and services other than fuel at the dispenser. The customer may purchase a car wash and/or order food from the QSR while fueling the vehicle. Preferably, the customer is provided a video menu at the display 100 to facilitate selection of the various services, goods and food available for purchase. The card reader 88 and cash acceptor 90 allow the customer to pay for any of the services, goods or food ordered at the dispenser while the printer 92 will provide a written record of the transaction. The dispenser control system 80 is operatively associated with a dispenser interrogator 52, which has a receiver 142 and a transmitter 144. The receiver and transmitter typically associate with one or more antennas 108 to provide remote communications with a transponder. The dispenser control system 80 communicates with the central control system 50 in the backroom 26.

Figure 6:
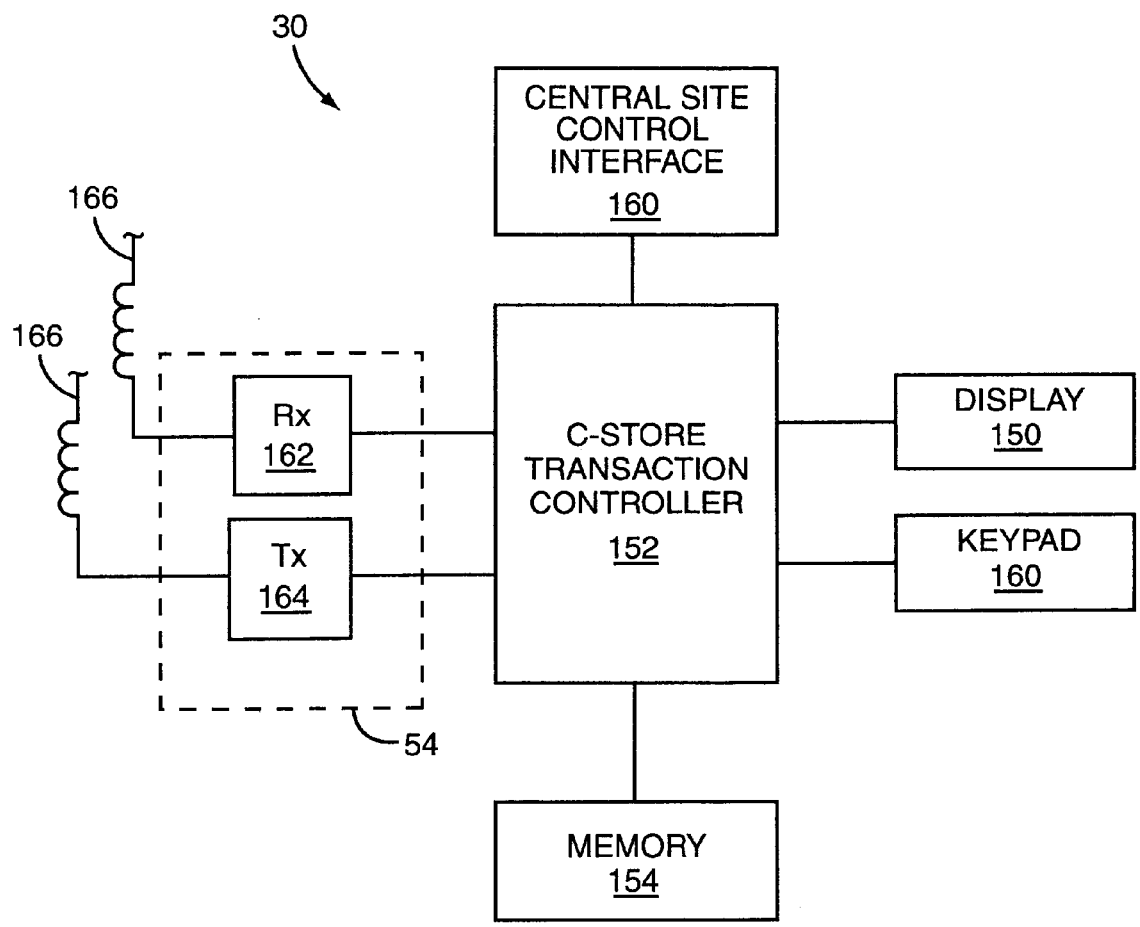
FIG. 6 is a schematic representation of convenience store transaction electronics, including a transaction terminal, for a fueling environment constructed according to the present invention.

In like fashion, the convenience store transaction electronics shown in FIG. 6, and more specifically the transaction terminal register 30, include a store transaction controller 152, associated memory 154, the interrogator 54, and a display and key pad 150, 160 forming a transaction terminal interface. The transaction controller 152 interacts with the central control system 50 through the central site control interface 160. The interrogator 54 includes a receiver 162 and a transmitter 164, both of which are associated with one or more antennas 166. The transaction terminal 30 is adapted to provide typical transaction functions of a cash register and a card authorization terminal in addition to communicating with transponders within the store and/or proximate to the terminal. The communications between the transponder and the store transaction terminal are generally related to transactional and customer identification and monitoring, although other features will become apparent to those skilled in the art upon reading this disclosure.

Figure 7:
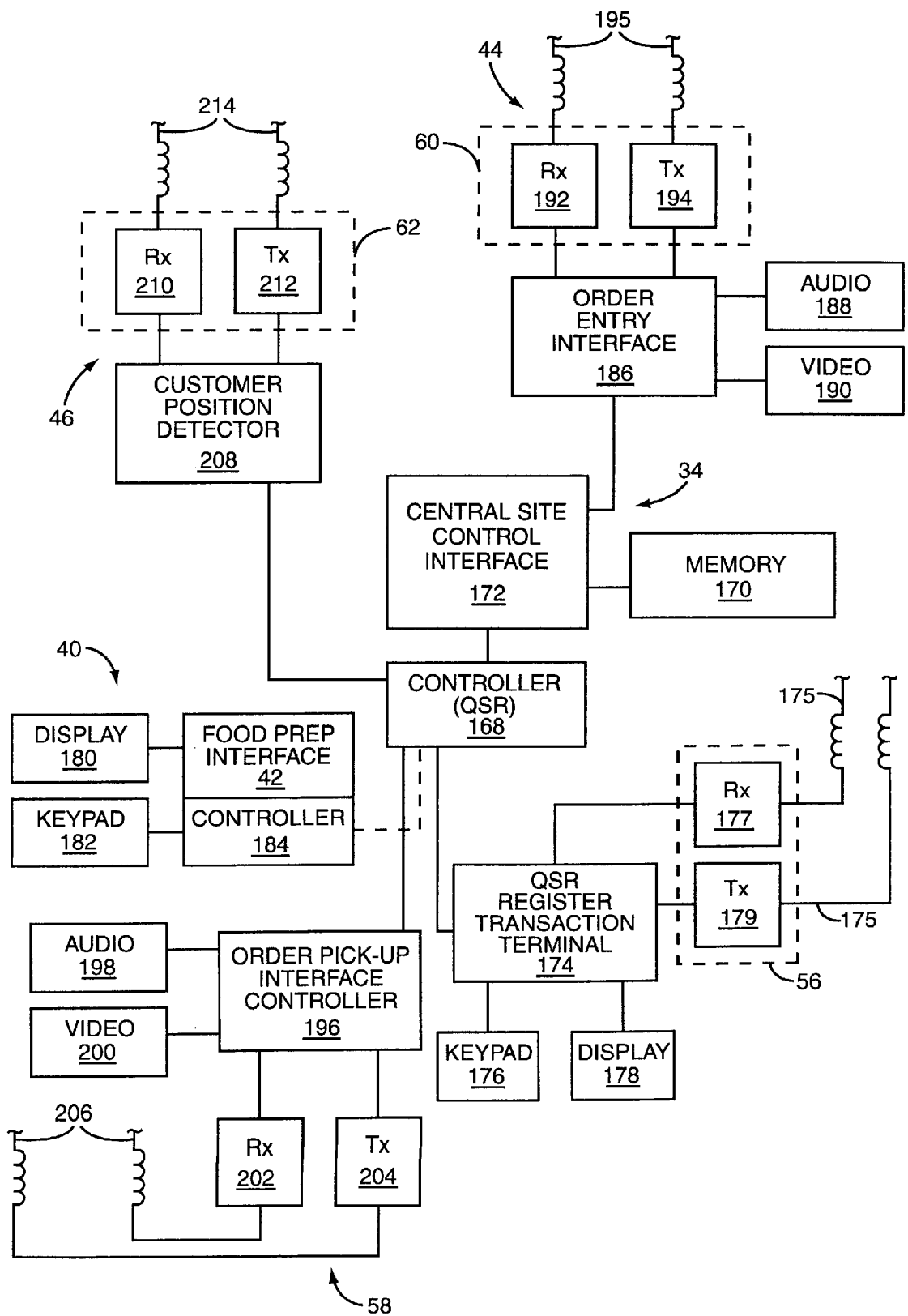
FIG. 7 is a schematic representation of a quick-serve restaurant control system for a fueling environment constructed according to the present invention.

Attention is now drawn to FIG. 7 and the schematic outline of the QSR electronics shown therein. The QSR will generally have a controller 168 and associated memory 170 capable of interfacing with the central control system 50 through a central site control interface 172. As with many QSR's, a transaction terminal or register 174 is provided having a key pad 176 and display 178. The QSR transaction terminal 174 is used by a QSR operator to take customer orders from within the store in conventional fashion. The orders are either verbally or electronically communicated to the food preparation area 40 through the QSR controller 168. The QSR transaction terminal 174 is associated with interrogator 56 having a receiver 177 and a transmitter 179 associated with one or more antennas 175. The food preparation area will typically have a food preparation interface 42 having a display 180 and a key pad 182. The food preparation interface 42 may be a terminal run from the QSR controller 168 or may contain a food preparation controller 184 within the food preparation interface 42. However the system is arranged, order information is passed from one of the order interfaces to the food preparation display 180 to alert food preparers of an order.

In a QSR embodiment providing drive-thru capability, a remote order entry interface 186 is provided. The order entry interface 186 may include a simple menu board and audio intercom system 188, or in a more sophisticated embodiment, may provide for bi-directional video intercom using the audio intercom 188 and a video system 190 allowing the customer and QSR operator to audibly and visually interact with one another during order placement. The order entry interface 186 may also include an interrogator 60 having a receiver 192 and a transmitter 194, associated with one or more antennas 195, for communicating with a transponder of a customer when the customer is placing an order at the order entry interface 186.

Typically, orders placed at the order entry interface 186 are sent to the order pick-up interface 196, which is normally situated proximate to the pick-up window 36 at the end of the drive-thru lane. The order pick-up interface 196 will have an audio system 198 to provide the audio intercom and an optional video system 200 if video intercom with the order entry interface 186 is desired. The order pick-up interface 196 also has an associated interrogator 58 having a receiver 202 and a transmitter 204 associated with one or more antennas 206.

Unlike existing QSR's, the present invention may include a customer position detector 208, preferably placed somewhere along the drive-thru lane to detect when a customer is at or is past that position en route to pick up an order, which may have been placed at a fuel dispenser 18. The customer position detector 208 is associated with the drive-thru position interrogator 62 and includes a receiver 210 and a transmitter 212 associated with one or more antennas 214.

Figure 8:
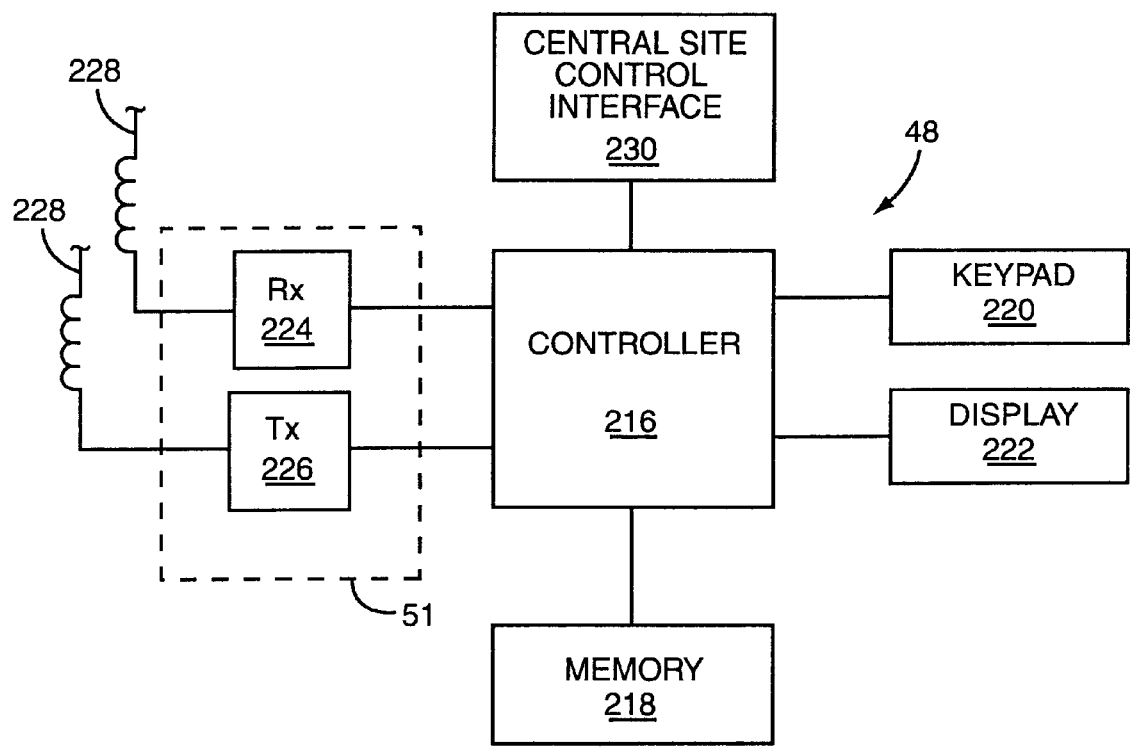
FIG. 8 is a schematic representation of a car wash control system constructed according to the present invention.

FIG. 8 depicts the basic outline of the car wash electronics, which includes a controller 216, memory 218, a key pad 220, a display 222 and the interrogator 51. The key pad 220 and display 222 combine with the controller 216 to provide a customer interface 48. The interrogator 51 includes a receiver 224 and a transmitter 226 associated with one or more antennas 228. Additionally, the car wash controller 216 preferably communicates with the central control system 50 in the store via a central site control interface 230. The interrogator 51 will typically communicate with a customer transponder to automatically authorize a car wash previously paid for at the dispenser or inside the store. The key pad may be used to insert a secret code or other information to select a type of wash or otherwise authorize the car wash.

Figure 9:
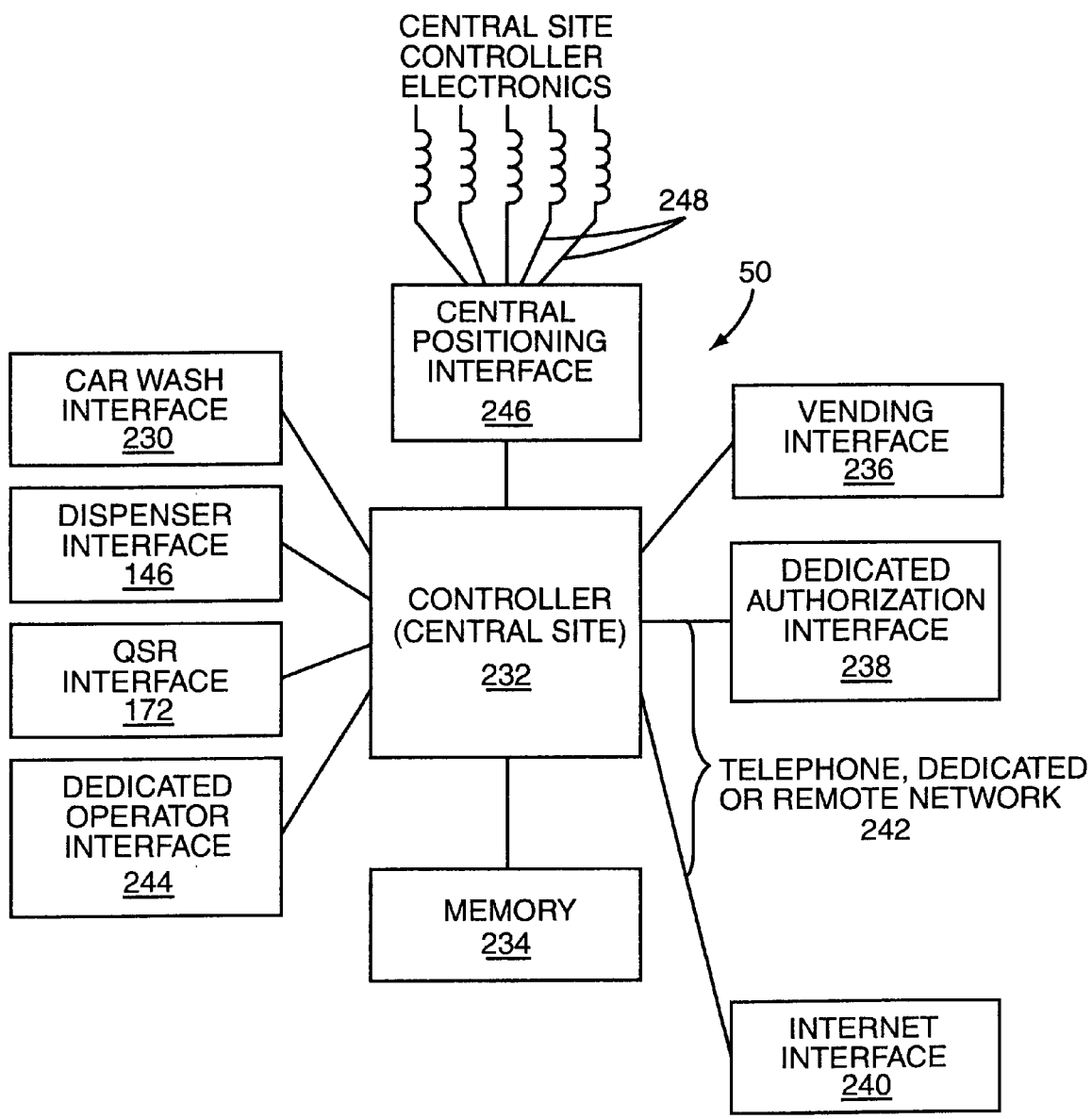
FIG. 9 is a schematic representation of a central control system for a fueling environment constructed according to the present invention.

FIG. 9 generally depicts the central control system 50 found in the backroom 26 of the fueling environment 10. The central control system 50 may include one or more controllers 232 associated with memory 234. The central control system 50 may include multiple interfaces with the various areas in the fueling environment 10. These interfaces include the car wash interface 230, dispenser interface 146, QSR interface 172 and the vending interface 236 connected to an automated vending machine 28. Additionally, the central controller 232 may have a dedicated network or authorization interface 238 connected to a host transaction network 94 for authorizing credit and debit transactions and the like. An Internet interface may also be provided for transactions and other information relating to operation, advertising, merchandising and general inventory and management functions.

The dedicated authorization interface and/or Internet interface may operate on a dedicated service line or a telephone system 242. Furthermore, the central control system 50 may have a direct operator interface 244 associated with the controller 232 to allow an operator to interact with the control system. In more advanced embodiments, a central positioning interface 246 associated with multiple antennas 248 may be used to determine transponder position and location throughout the fueling environment. Those skilled in the art will be aware of a multitude of positioning and locating techniques, such as triangulation, wherein various characteristics of a signal emitted from the transponder are measured and monitored to determine movement as well as precise location. The antennas 248 associated with the central positioning interface 246 may take the place of or act in conjunction with the various antennas throughout the fueling environment to locate and monitor movement of the transponders in the fueling environment. Attention is drawn to application Ser. No. 08/966,237 entitled TRANSPONDER DISTINCTION IN A FUELING ENVIRONMENT filed Nov. 7, 1997, in the name of William S. Johnson, Jr. and application Ser. No. 08/759,733 filed Dec. 6, 1996, entitled INTELLIGENT FUELING in the name of H. Craig Hartsell, Jr. et al. The entire disclosure of these two patent applications is incorporated herein by reference.

Of particular importance in the current invention, the transponder 14 may be configured to transmit a signal indicative of the absence or presence of an ORVR system. When a dispenser 18 receives a signal indicating the absence or presence of an ORVR system, the vapor recovery system of the dispenser 18 may be shut-off or modified as desired during the subsequent fueling operation. A simplistic approach incorporates a signal from the transponder 14 to the dispenser 18 to indicate the presence of an ORVR system. Notably, this source signal may also be used to determine the vehicle's proximity or location relative to the fueling position. Upon receipt of this signal, the dispenser 18 will deactivate the vapor recovery system during the fueling operation. A more complex system may incorporate a two-way communication link between the transponder 14 and the dispenser 18 wherein information in addition to that regarding the presence of an ORVR system is included to enable the dispenser to control the vapor recovery system in conjunction with the vehicle's ORVR system to maximize vapor recovery and fuel flow rate and/or according to a vapor recovery control function for the particular vehicle.

Figure 10A:
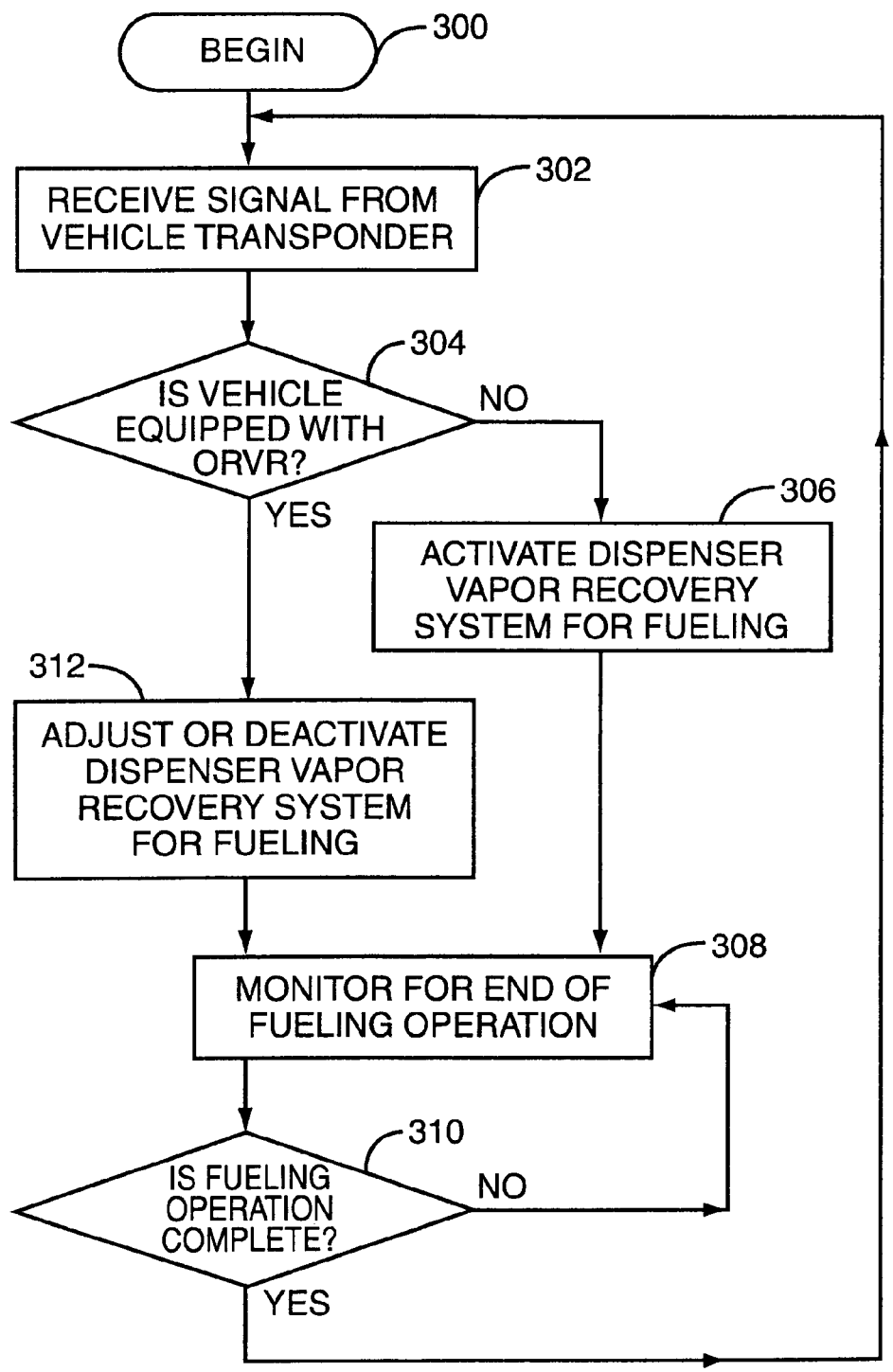
FIG. 10A is a flow chart representing a basic flow of a control process for controlling a vapor recovery system according to the present invention.

A basic flow chart of these processes is shown in FIG. 10A. The process starts (block 300) wherein the control system begins to monitor and receive signals from the vehicle's transponder 14 (block 302). The control system will determine whether the vehicle is equipped with an ORVR system (decision block 304). If the vehicle is not equipped with an ORVR system, the control system will activate the dispensers vapor recovery system for the subsequent fueling operation (block 306). The control system will monitor for the end of the fueling operation (block 308) and determine the end of the fueling operation (block 310). Once the fueling operation is complete, the process is ready to be repeated. If the transponder 64 represents to the control system that the vehicle 14 is equipped with an ORVR system (decision block 304), the vehicle's vapor recovery system may be adjusted or deactivated completely during the subsequent fueling operation (block 312).

Figure 10B:
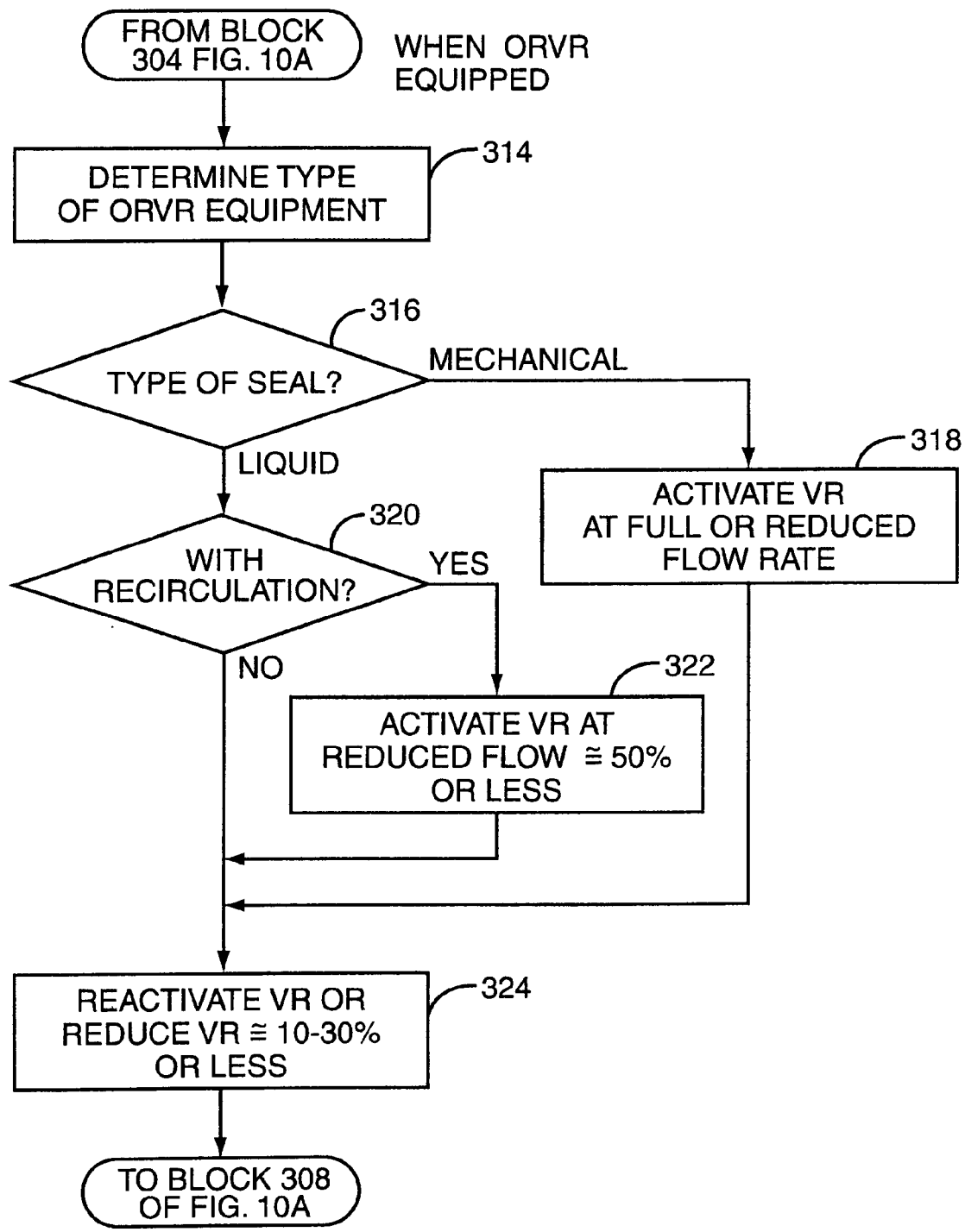
FIG. 10B is a flow chart representing a detailed flow of a process controlling a vapor recovery system depending on the type of ORVR equipment present on the vehicle.

As noted, when ORVR equipment is detected on the vehicle, the vapor recovery control system may adjust or deactivate the vapor recovery system in various ways. Preferably the control system is adapted to receive the type of ORVR equipment and control the vapor recovery system of the fuel dispenser accordingly. An exemplary process of the preferred embodiment is shown in FIG. 10B. The scenario depicted in FIG. 10B represents a preferred scenario and is not intended to limit the concept of controlling the vapor recovery system based on the type of ORVR equipment on the vehicle. With this in mind, the process is picked up after ORVR equipment is detected (block 304 of FIG. 10A).

Once ORVR equipment is detected, the control system determines the type of ORVR equipment present on the vehicle (block 314). The control system will determine whether the ORVR equipment uses a mechanical or liquid seal (block 316). If a mechanical seal is used, the control system will preferably activate the vapor recovery system at a full or reduced flow rate to compensate for the volume of fuel leaving the underground storage tank 81 (block 318). The rate of vapor flow will typically depend on differences between ambient and underground tank conditions. If a liquid seal is used, then preferably the flow rate is designed to run at a reduced flow rate to facilitate ingestion of hydrocarbon vapors escaping the vehicle's ORVR equipment while minimizing the amount of hydrocarbon-free air ingested in the tank. As discussed in detail below, ingesting unsaturated, hydrocarbon-free air into the underground tank is preferably avoided to the extent possible.

If a liquid seal is detected, the control system will determine whether or not the vehicle's tank and ORVR system provides recirculation with the liquid seal embodiment (block 320). If recirculation is provided, the control system will completely deactivate the vapor recovery system or activate the vapor recovery system of the fuel dispenser at a significantly reduced flow rate of generally about fifty percent (50%) or less (block 322), depending upon conditions. In liquid seal arrangements using recirculation, there tends to be a higher vapor concentration at or near the nozzle spout 77 in the fill neck 2 of the fuel tank 4 than in liquid seal systems without recirculation. The control system will preferably run the vapor recovery equipment of the dispenser at a recovery rate sufficient to replace the volume lost in the storage tank and, with enough unsaturated hydrocarbon/air vapor mixture that, when saturated, equals the volume of fuel removed from the underground storage tank, while minimizing the escape of any hydrocarbon vapor from the vehicle fill neck 2 to atmosphere.

When a liquid seal embodiment without recirculation is detected, the control system will completely deactivate the vapor recovery system or may substantially reduce the rate of flow in the vapor recovery system to typically ten to thirty percent (10%–30%) of the nominal flow rate used during a normal vapor recovery operation (block 324). Running the dispenser's vapor recovery system for both liquid seal types without these controls would result in ingesting excess hydrocarbon-free air—a situation preferably avoided. Importantly, the control system is adapted to operate in conjunction with the communications electronics of the dispenser to determine the type of ORVR equipment and control the vapor recovery system to optimize vapor recovery and reduce the amount of unsaturated or hydrocarbon-free air ingested into the underground tank. After the type of ORVR equipment is detected and the control is determined, the process will continue as shown in FIG. 10A (block 308) by monitoring for the end of the fueling operation. Currently, there are no ORVR recovery requirements when fueling at a rate under 4 gpm. The dispenser may operate the vapor recovery system at normal rates in order to achieve higher overall recovery rates during a portion of or the entire fueling operation.

Figure 10C:
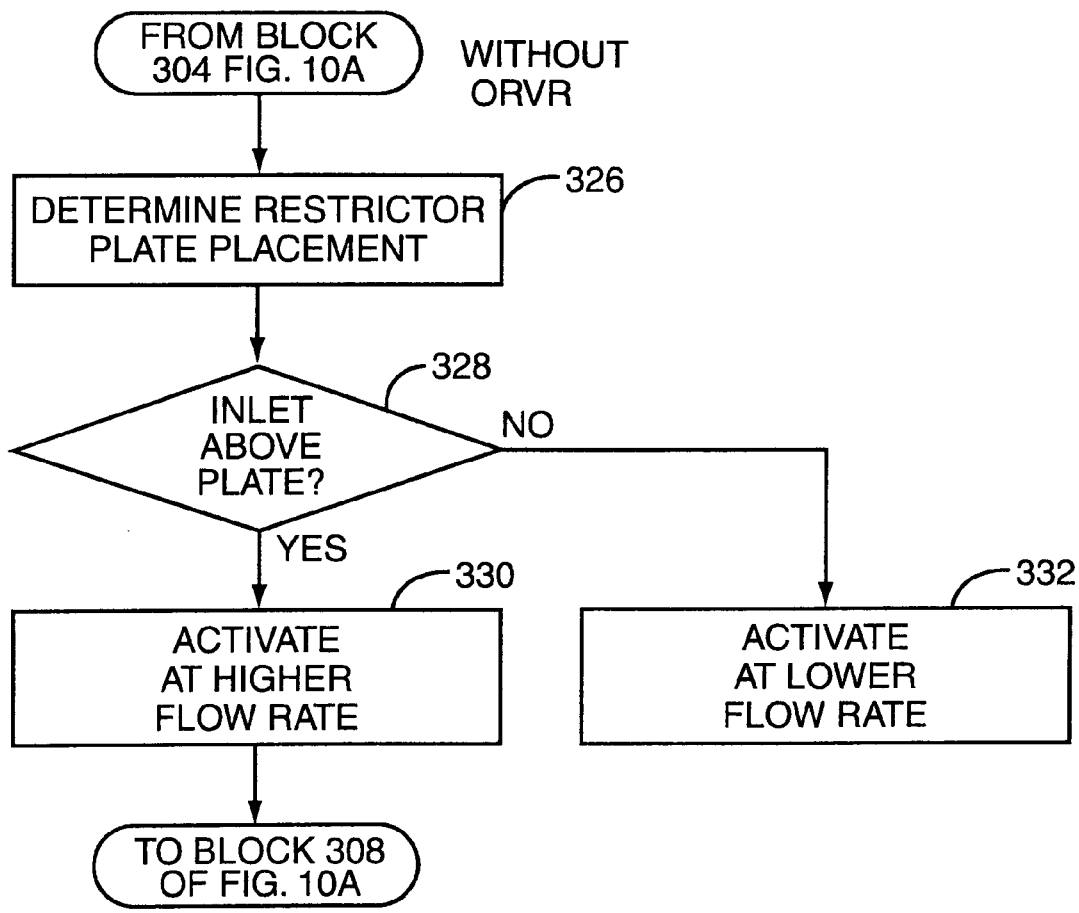
FIG. 10C is a flow chart representing a basic flow of a control process controlling the vapor recovery system according to the placement of a restrictor plate in the fill neck of a vehicle's fuel tank according to the present invention.
Figure 10D:
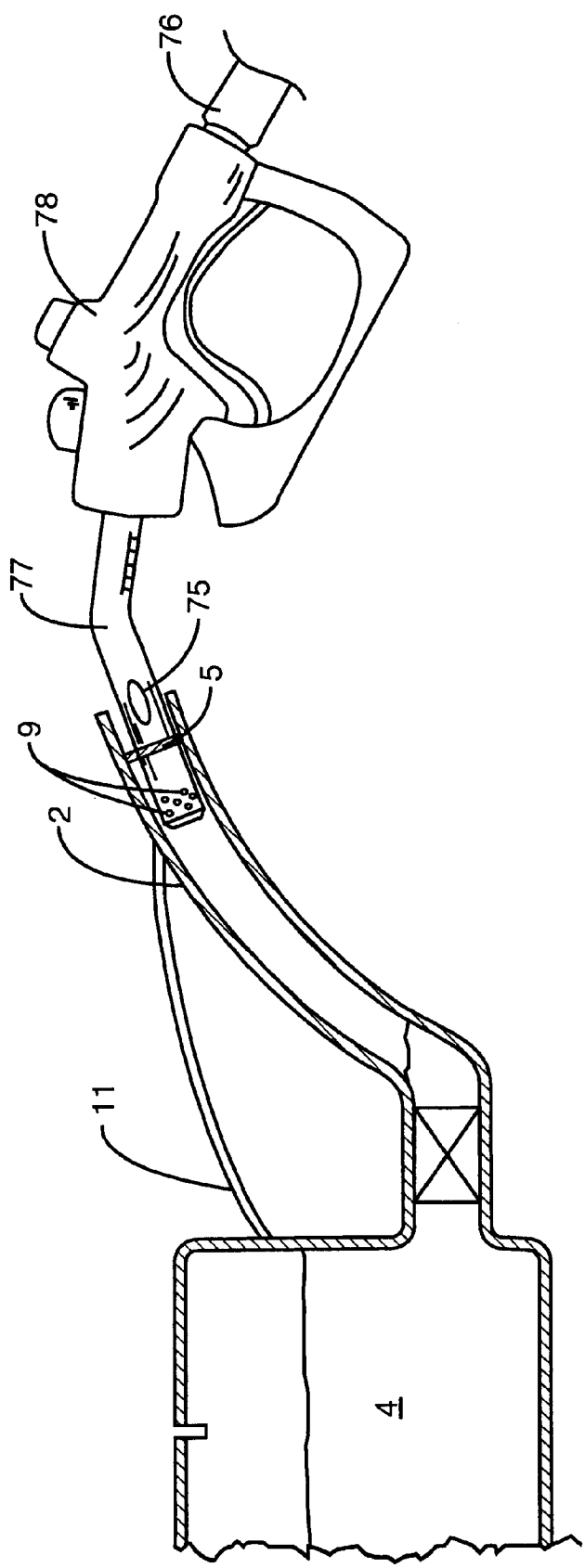
FIG. 10D is a schematic representation of a vehicle's fuel tank having a restrictor plate and vent tube.

FIG. 10C depicts more detail of the exemplary process shown in FIG. 10A when ORVR equipment is not present on the vehicle being fueled. The detail relates to the vapor recovery control of the fuel dispenser's vapor recovery system when the placement of a restrictor plate 5 in the fill neck 2 of a fuel tank 4 is known. As shown in FIG. 10D, the nozzle spout 77 typically extends through a restrictor plate 5 in the fuel tank's fill neck 2. The nozzle 77 includes a plurality of apertures 9 communicating with the vapor return passage 24 (shown in FIG. 3B). The restrictor plate 5 substantially blocks the fuel tank's fill neck 2 and includes an opening sized to allow the nozzle spout to extend through during fueling. The opening may have a door, which closes when the vehicle is not being fueled. Most non-ORVR fuel tanks have a vent tube 11 running from a top portion of the tank to a point near the end of the fill neck. Certain fuel tanks have the vents extending past the restrictor plate, such that vapors vented from the top of the tank through the vent tube are placed back into the fill neck between the restrictor plate and the outside of the vehicle, while other tanks balance vapors via the vent tube 11 back into the fill neck 2 between the fuel tank 4 and the restrictor plate as shown in FIG. 10D. In the former situation where the vent tube is above the restrictor plate, it is more difficult to recover the fuel vapors because of the unconfined environment at the end of the fill neck. When the vent tube 11 connects to the fill neck 2 below the restrictor plate 5, the vapors are concentrated in the confined area just before the restrictor plate near the end of the fill neck.

Thus, an embodiment of the present invention is adapted to determine the placement of the restrictor plate relative to the vapor return inlet of the vent tube and control vapor recovery accordingly. Again, the information will be provided by the transponder 64 of the vehicle 14 (block 326). If the inlet is above the restrictor plate (block 328), the control system will operate the dispenser's vapor recovery system at a higher flow rate (block 330) given the increased difficulty in recovering vapors in the relatively uncontained area between the restrictor plate and ambient near the very end of the fill neck. If the inlet is not above the restrictor plate, the control system will operate the dispenser's vapor recovery system at a lower flow rate (block 332) because the fuel vapors will be highly concentrated and contained below the restrictor plate near an upper portion of the fill neck. Once the vapor recovery control is set, the process will return to block 308 of FIG. 10A.

Figure 11:
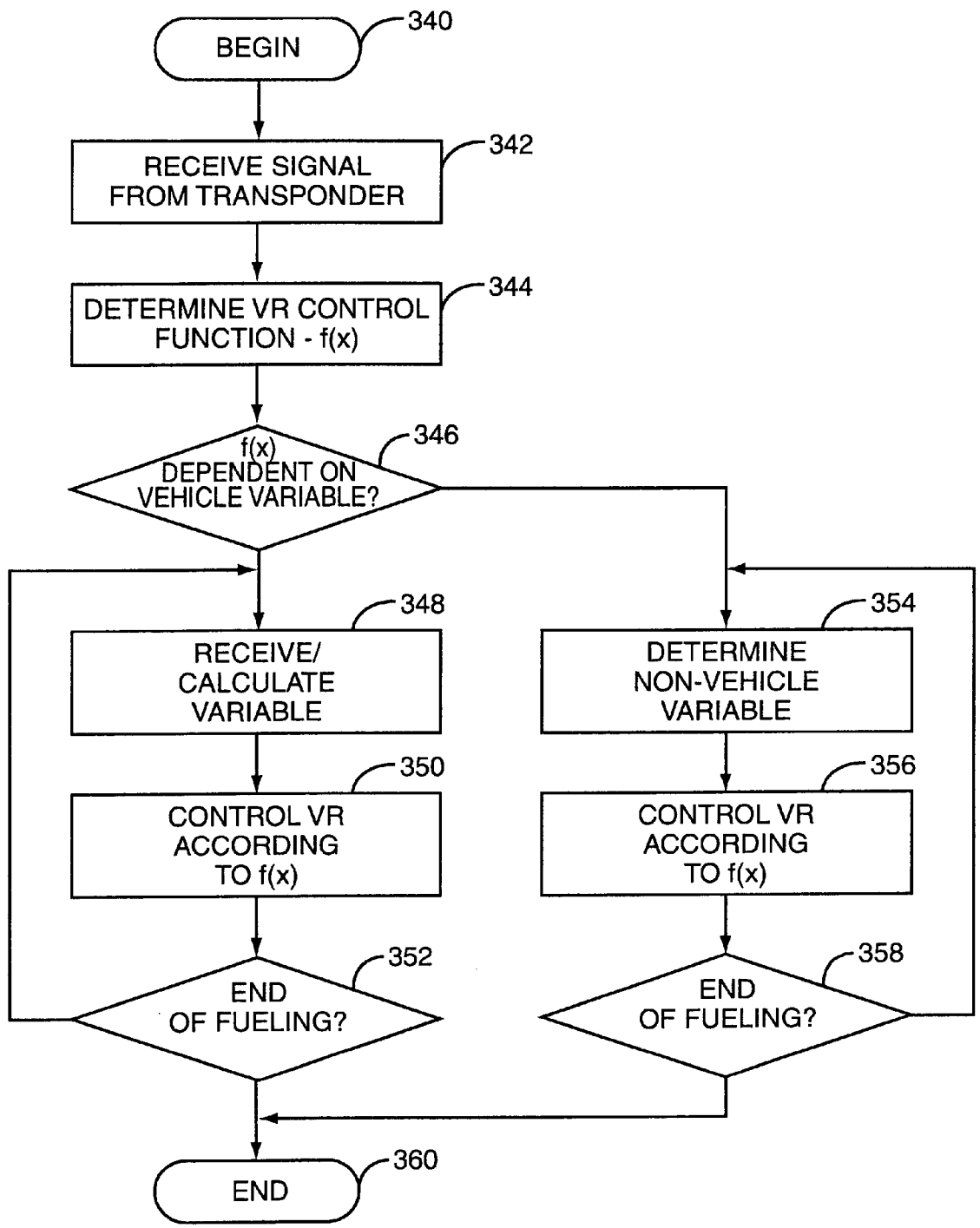
FIG. 11 is a flow chart representing a basic flow of a vapor recovery control process according to the present invention.

Another control option, used alone or in combination with the earlier described processes, provides a vapor recovery control function to optimize vapor recovery for a particular vehicle and/or fuel tank configuration with or without ORVR equipment. As shown in FIG. 11, the process begins (block 340) where signals are received from a transponder (block 342). From these signals, the control system determines a vapor recovery control function (block 344). The control function may take many forms and be dependent upon a number of different variables. The variables may be vehicle specific, such as ullage values, fuel quantities, temperature, pressure, or any combination thereof, to name a few. The variables may also be non-vehicle specific, such as time, flow rate, vapor recovery flow rate or amount of fuel delivered. Additionally, the function may be a constant representing a fixed flow rate for a particular vehicle or tank configuration.

The control system will determine whether or not the vapor recovery control function is dependent upon a vehicle-specific variable (block 346). If the function is dependent upon a vehicle-specific variable, the control system will receive or calculate the variable and control function (block 348) and control the vapor recovery system accordingly (block 350). The system will then monitor for the end of fueling (block 352). If fueling is not at an end, the process may include a loop to repeat in which a new value is either received from the vehicle or calculated at the control system to arrive at a flow rate according to the vapor recovery function. For example, if the function is based on ullage, the control system may continuously monitor the new ullage values from the vehicle or calculate the new ullage values based on the original ullage value and the amount of fuel delivered, which is a value capable of being determined by the dispenser. At the end of fueling, the process ends (block 360).

If the vapor recovery control function is not dependent upon the vehicle variable (block 346), the appropriate variables are determined, if necessary, at the control system (block 354). The vapor recovery control function will be calculated based on the desired variables, and the vapor recovery system is controlled accordingly (block 356). The control system will repeat the process until the end of fueling (blocks 358, 360). Notably, if the vapor recovery control function is a constant, the control system need not update the control function throughout the fueling process. However, certain embodiments may require a combination of a constant vapor recovery flow rate for one portion of the fueling operation and a variable flow rate for another portion of the fueling operation.

Furthermore, the vapor recovery control function may also be based on hydrocarbon concentrations at the vapor recovery point on the nozzle spout. In such an embodiment, a hydrocarbon sensor 75 may be placed at the end of the nozzle spout or anywhere along the vapor recovery path to monitor hydrocarbon concentrations and provide feedback to the control system. The control system will control the vapor recovery flow rate in order to maximize vapor recovery while minimizing the ingestion of hydrocarbon-free air into the underground storage tank 81. Attention is drawn to U.S. patent application Ser. No. 08/649,455 entitled ONBOARD VAPOR RECOVERY DETECTION filed on May 17, 1996. This Gilbarco Inc, application provides details of the use of hydrocarbon sensing in controlling a vapor recovery system and is incorporated herein by reference.

Even when an ORVR equipped vehicle is detected, it may be desirable to have the dispenser's vapor recovery system operate to supply an amount of air to the storage tank required to replenish the volume of liquid taken from the tank during the fueling operation to minimize or eliminate tank breathing loses discussed above. In a more complex system, the transponder of the vehicle and dispenser may also communicate information relating to the effectiveness or the presence of a malfunction of the ORVR system. In such cases, the dispenser may further modify or activate the vapor recovery system accordingly to minimize the escape of vapors during the fueling operation.

In sum, once the absence or presence of an ORVR equipped vehicle is detected, various vapor recovery control options are available. Appropriate control of the fuel dispenser's vapor recovery system reduces underground fuel tank pressure and thereby reduces loses due to fugitive emissions and reduces wear and unnecessary use of assist-type vapor recovery systems when operation would be redundant. The vapor recovery system may provide enough ambient air to the underground tank, so that when the air saturates, the hydrocarbon saturated air volume is approximately equal to the amount of fuel dispensed, thereby minimizing pressure fluctuations in the underground tanks. Another option, particularly useful with liquid driven vapor pumps, is to use an output of the control system to open a valve to ambient to redirect the air flow of the vapor recovery passage to atmosphere through an ambient vent (not shown).

Preferably, ORVR determination and other vehicle/dispenser communications are established in conjunction with determining the vehicle's location relative to a unique fueling position. Various other modifications and improvements will occur to those skilled in the art upon reading the foregoing description. It should be understood that all such modifications and improvements have been omitted for the sake of conciseness and readability but are properly within the scope of the following claims.

In several aspects of the present invention, it is desirable to determine the location and/or proximity of a transponder, whether vehicle mounted or carried by a customer, with respect to a specific fueling position of a dispenser or interrogation system. In other aspects, it is desirable to track the transponder throughout the fueling environment 10. Although the embodiments described herein use the dispenser as a reference, any of the interrogation systems in the fueling environment may be adapted to determine transponder location and/or proximity.

Determining location and proximity of a transponder with respect to a fuel dispenser in a fueling environment presents a unique problem because the fueling environment includes multiple dispensers with multiple positions. At any given time, numerous transponders will be in or moving about the fueling environment and the many interrogation fields associated with the various interrogators. The dispensers and associated control systems must distinguish between personal and vehicle-mounted transponders used to carry out a transaction from transponders attached to a vehicle driving by the fueling position or carried by a person walking by the dispenser. Fueling environments must be able to avoid communicating with a second transponder during a transaction with a first transponder.

Texas Instruments has made an attempt at implementing a system in a fueling environment capable of communicating with transponders. The beta sites for the Texas Instruments system are believed to communicate with transponders using an interrogator transmitting an interrogation signal having a 134 kHz carrier. Any transponders within range of the 134 kHz signal will transmit a signal back to the interrogator using a 903 MHz carrier. The Texas Instruments system includes a large loop antenna associated with the dispenser for transmitting the 134 kHz signal and a much smaller antenna for receiving the 903 MHz signal from the transponder. The 134 kHz transmission signal from the interrogator has a limited communication range, which requires the transponder to be within 2–6 inches of the large loop antenna to provide the transponder sufficient energy to transmit information back to the interrogator. Additionally, the 903 MHz signal transmitted from the transponder to the interrogator is substantially non-directional and can be heard throughout the entire fueling environment and most likely for quite some distance outside the fueling environment. Transponder transmissions carrying throughout the fueling environment add difficulty in correlating a transponder with the proper dispenser and respective fueling position.

Applicants' invention provides a solution to the difficulties of locating and communicating with transponders within the fueling environment by (1) providing a communications system operating at frequency ranges which are very directional, (2) controlling the power at which the communications system operates and (3) simplifying the communications electronics by operating at the same carrier frequencies communicating with the transponder. Communicating at substantially the same carrier frequency allows interrogators to use the same or similar antennas to transmit and receive. Furthermore, these more directional frequencies require smaller antennas, which are easily integrated into the fueling environment or dispenser in an economical and aesthetically acceptable manner.

Figure 12A:
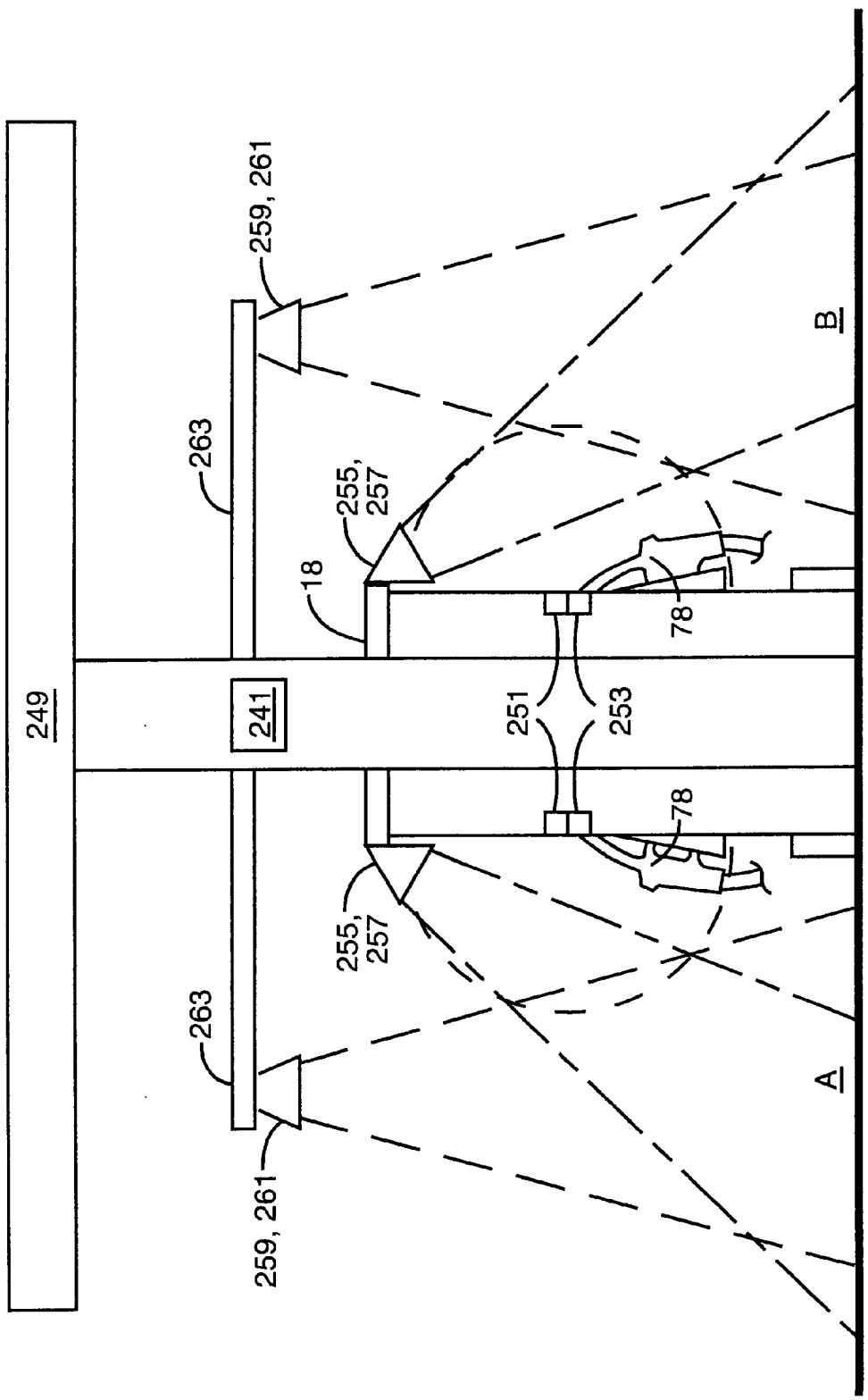
FIG. 12A is a schematic representation of a side view of a dispenser having multiple antenna arrangements for providing directional interrogation fields constructed according to the present invention.
Figure 12B:
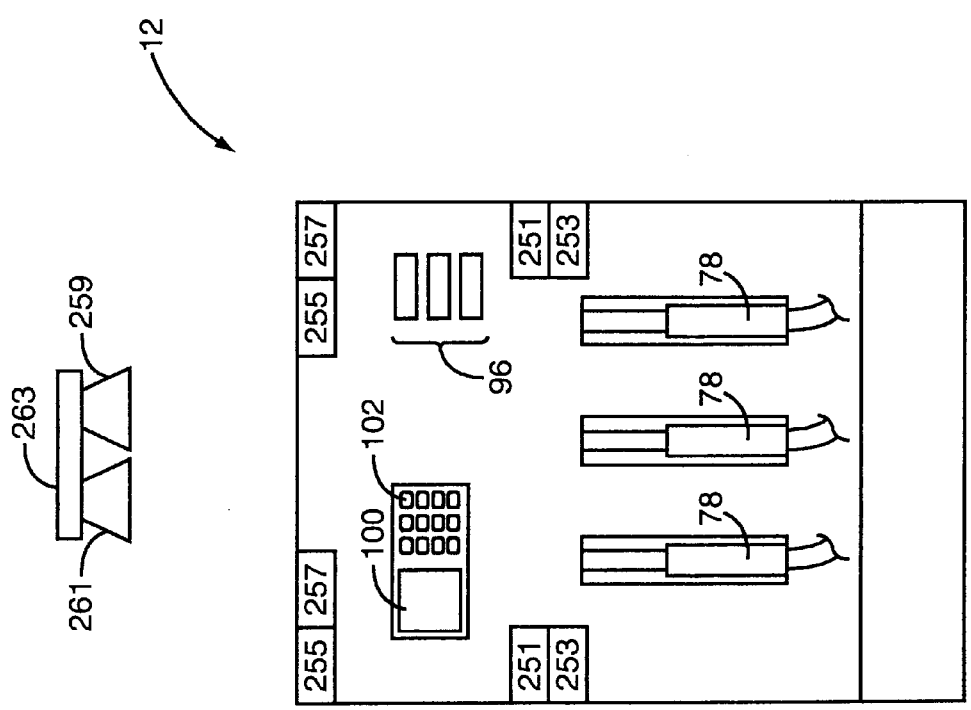
FIG. 12B is a schematic representation of a front view of a dispenser having multiple antenna arrangements for providing directional interrogation fields constructed according to the present invention.

The preferred arrangement of applicants' antennas is shown in FIGS. 12A and 12B. In FIG. 12A, a side view of a fuel dispenser 18 under an awning 248 is shown with multiple configurations of antennas adapted to communicate with various transponders proximate to either of the fueling positions A or B. The antennas are adapted to transmit, receive or transmit and receive at substantially directional frequencies, including those in the microwave range, and preferably around about 2.45 GHz. In these embodiments, there are basically three suggested antenna locations wherein various combinations of antennas at these locations are used. Please note that the antennas of FIGS. 12A and 12B are not referenced as 108, for the sake of clarity in describing antenna placement.

The first antenna location is near the middle of a front face of the dispenser 18. A mid-dispenser transmit antenna 251 and mid-dispenser receive antenna 253 are placed near this midpoint. The antennas may be located in the central portion of the dispenser or located anywhere along the front face of the dispenser, including near the respective sides of the dispenser as shown in FIG. 12B. The mid-dispenser antennas 251, 253 preferably provide a limited power and limited range field pattern to communicate with a transponder 66 carried by a customer. The field provided by the mid-dispenser transmit antenna 251 is preferably large enough to properly communicate with the customer-carried transponder 66 in the fueling position and in front of the dispenser without requiring the customer to remove the transponder from a purse, wallet or pocket and wave the transponder next to the dispenser 18 or a receiving antenna.

Additionally, a top-mount transmit antenna 255 and top-mount receive antenna 257 may be provided at or near the top of the dispenser 18 and adapted to provide a focused, directional and preferably conically shaped field downward over the respective fueling position. These top-mount antennas 255, 257 are preferably located on each side of the dispenser 18 as shown in FIG. 12B in similar fashion to the preferred placement of the mid-dispenser antennas 251, 253. The duplication and spacing of these antennas help avoid interference caused by people or other objects breaking the communication path between the respective antenna and transponder. This allows the transponder to communicate with the dispenser through one antenna or set of antennas, even if something blocks the field from the other set of antennas.

Another option is to place the antenna substantially directly over the fueling position A or B. In such an embodiment, overhead receive antenna 259 and overhead transmit antenna 261 are mounted over the fueling position A, B using an overhead antenna mount 263. The overhead antennas 261, 263 operate in the same manner as the top-mount antennas 255, 257, and may also be spaced apart to provide varying positions to create an interrogation field. Notably, the antennas for receiving and transmitting may be combined into one wherein a suitable circulator or like electronics is incorporated into the interrogator or communications electronics to provide for reception and transmission from a single antenna. With any of these embodiments, the antennas may cooperate directly with the central control system 50 or with the dispenser control system 80 to allow overall system monitoring of transponders at the various positions. In these situations, the selected control system will alert the dispenser of transponder presence.

As noted, various combinations of these antennas can be used. For example, the preferred embodiment includes two mid-dispenser transmit antennas 251, two top-mount transmit antennas 255, and two top-mount receive antennas 257. The top-mount receive antennas 257 are adapted to receive signals transmitted from the transponder in response to signals from either the mid-dispenser transmit antennas 251 or the top-mount transmit antennas 255. In operation, when a customer-carried transponder 66 enters the field provided by the mid-dispenser transmit antenna 251, the transmitter reflects a signal which is received by the top-mount receive antenna 257. Alternatively, vehicle-mounted transponders 64 may enter the interrogation field provided by the top-mount transmit antenna 255 and respond with a signal received by the top-mount receive antenna 257.

The interrogation fields provided by any of the transmit antennas 251, 255, 259 may be adjusted to control the size and shape of the respective fields. For example, the system may be configured to more easily distinguish between transponders carried by a person and vehicle-mounted transponders by configuring the respective interrogation fields provided by the mid-dispenser transmit antenna 251 and the top-mount transmit antenna 255 or overhead transmit antenna 259, such that the respective interrogation fields do not overlap or overlap in a desired and select pattern. Thus, communications resulting from an interrogation with the mid-dispenser transmit antenna 251 indicate a transponder carried by the customer while communications resulting from the top-mount or overhead transmit antenna 255, 259 may be indicative of vehicle-mounted transponders.

Figure 12C:
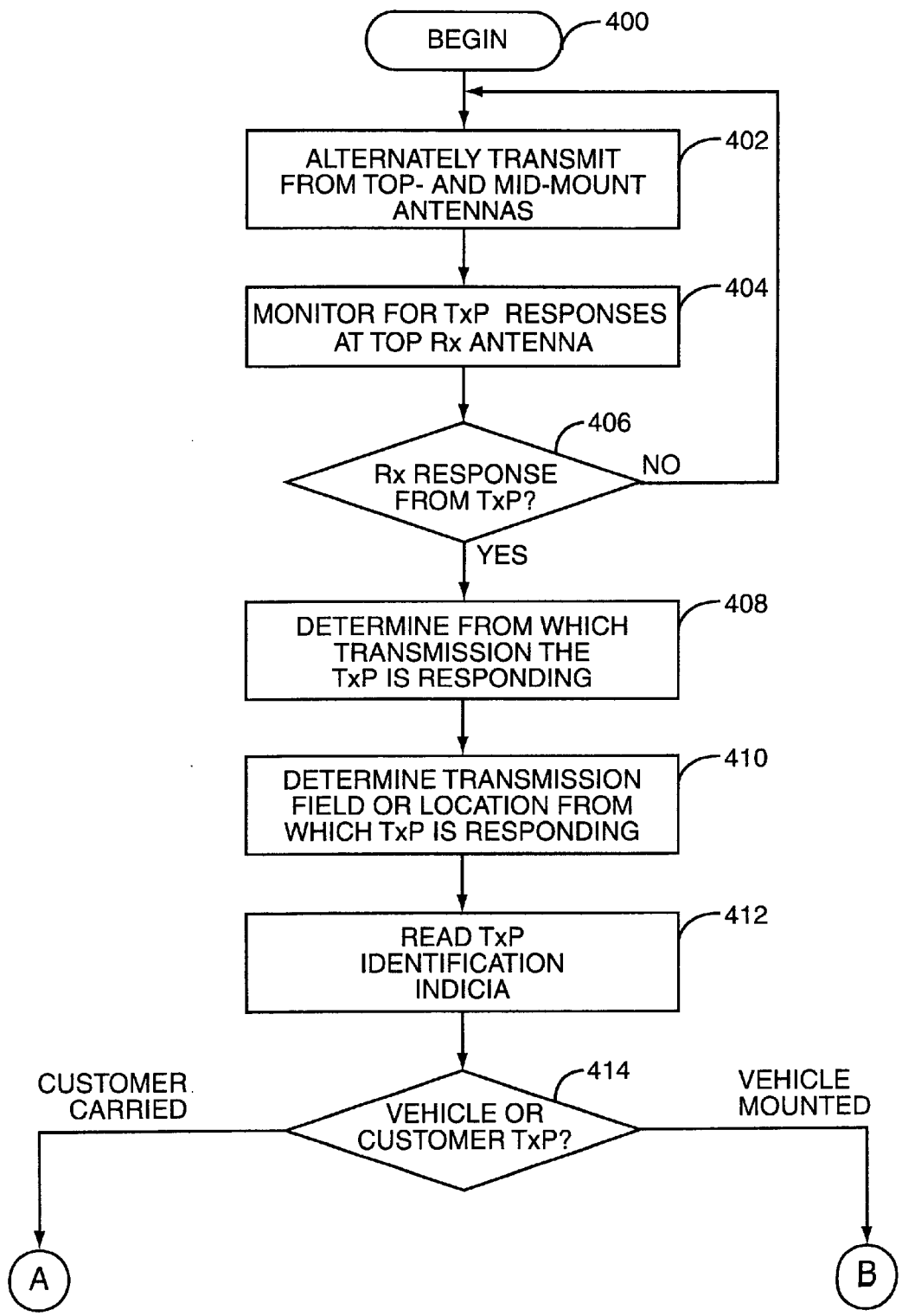
FIGS. 12C and 12D are a flow chart of a basic process for monitoring the location and type of transponder at a fueling position according to a preferred embodiment of the present invention.
Figure 12D:
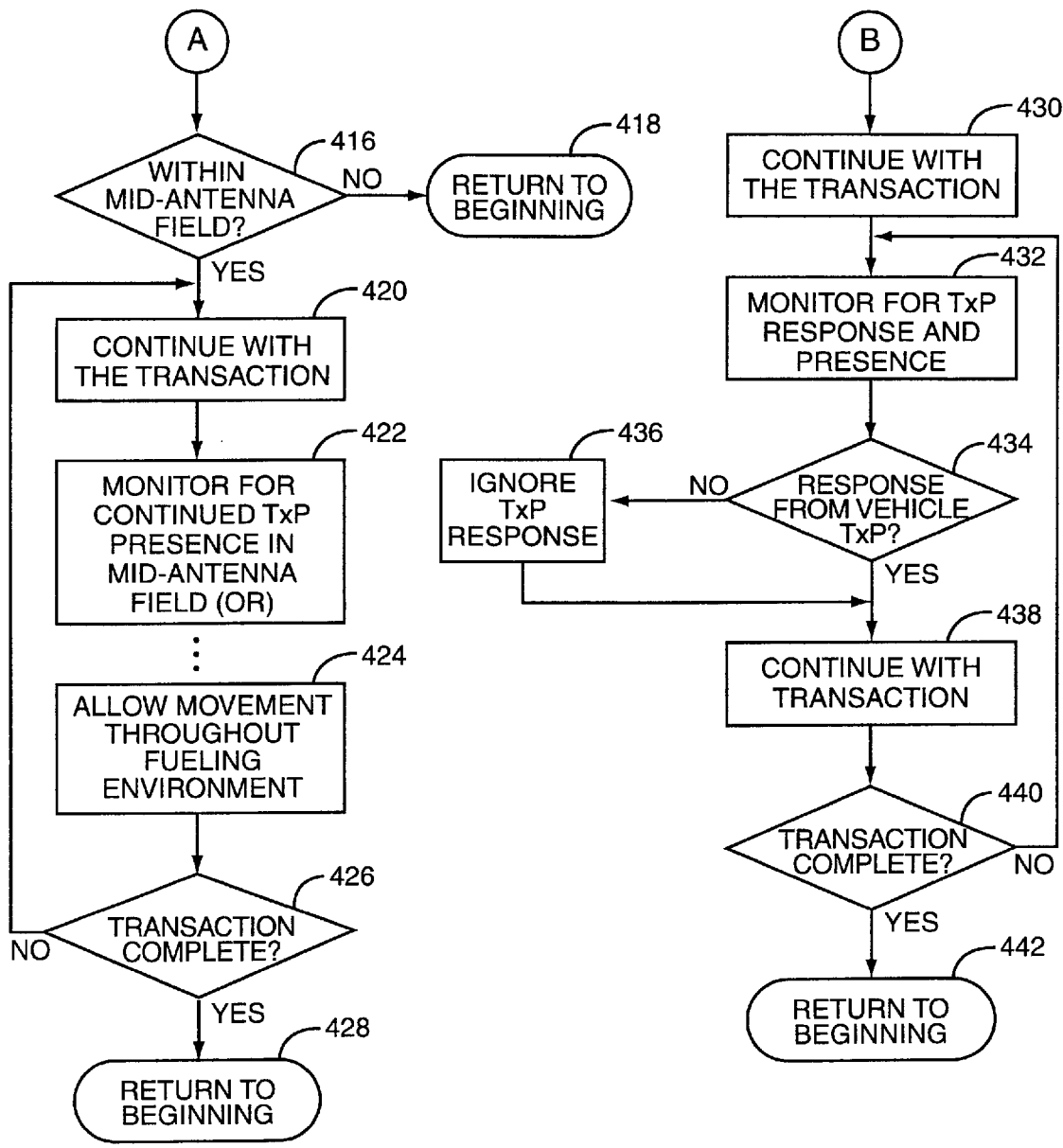

Attention is now drawn to FIGS. 12C and 12D, which depict a flow chart of a basic process for monitoring the location and position of a particular type of transponder using top-mount transmit antennas 255 or overhead transmit antennas 259 and a mid-dispenser transmit antenna 251 in conjunction with one or more top-mount or overhead-mount receive antennas 257, 261. In this preferred embodiment, one or more of the transmit antennas mounted substantially above the customer will alternate sending interrogation signals with one or more of the mid-dispenser transmit antennas 251. A response to either of these interrogation signals is received at a receive antenna mounted substantially above the customer, such as one of the top-mount receive antennas 257 or overhead receive antennas 261.

The basic operation of this embodiment begins (block 400) by alternately transmitting from the top and mid-mount antennas (block 402). The central control system 50 or dispenser control system 80 will monitor for responses from transponders within one of the interrogation fields (block 404). The control system will continue to monitor for a transponder response until a signal from a transponder is received (block 406). The control system will next determine from which transmission field the transponder is responding (block 408). In this embodiment, where the transmission fields alternate, the control system will simply determine if a transponder response was received during a time period when the top or overhead-mount antennas were generating the interrogation field or if the response occurred during the time the mid-dispenser transmit antenna 251 was generating the interrogation field.

Once the control system determines the field in which the transponder is responding, the appropriate location of the transponder is known (block 410). Typically, the transponder's response to the interrogation signal provides transponder identification indicia indicative of the type of transponder being interrogated (block 412). The type of transponder is generally vehicle mounted or carried by the person. Determining whether the transponder is vehicle mounted or carried by the person enables the control system to determine how to react to the presence of other transponders passing through the various interrogation fields during a communication with another transponder or make sure a transponder is properly located for the desired transaction. If the control system determines the transponder is one carried by a person (block 414) and that the transponder was within the mid-antenna field (block 416), the control system allows the transaction to continue (block 420). If the transponder is a customer-carried transponder that is not within the mid-antenna field (blocks 414 and 416), the control system will return to the beginning of the process (block 418). The latter situation is indicative of a transponder carried by the person being interrogated in one of the top or overhead antenna fields, which are preferably used to interrogate vehicle-mounted transponders exclusively. Thus, the system preferably ignores transponders carried by the person outside of the mid-antenna field, which is preferably focused in a manner requiring the customer to be substantially in front of the customer interface of the appropriate fueling position. The field associated with the mid-dispenser transmit antenna 251 is limited only by design choice and may extend several or more feet in front and to the sides of the fuel dispenser.

If the control system is communicating with a customer-carried transponder within the mid-antenna field, the control system may monitor for the continued presence of the transponder in the mid-antenna field (block 422) or allow movement of the customer-carried transponder throughout the fueling environment (block 422). Notably, it is often desirable to only require the customer-carried transponder to be within the mid-antenna field long enough to start the transaction and fueling operation, and allow the customer to leave the fueling area during the fueling operation. Unlike a customer-carried transponder, the control system would preferably require the presence of the vehicle in the appropriate transmission field throughout the fueling operation for safety reasons. Regardless of how the control system monitors the presence or movement of the customer-carried transponder during the transaction, the transaction will continue until complete (block 426), wherein the process will begin anew (block 428).

If the control system determines a vehicle-mounted transponder is within the appropriate transmission field (block 414), the transaction will continue (block 430). Preferably, the control system will make sure that the vehicle has stopped moving and has been in position long enough to indicate a transaction associated with the responding transponder is likely. As noted above, the control system will preferably continue to monitor for the vehicle-mounted transponder's presence (block 432) throughout fueling. The control system is preferably capable of distinguishing responses from the vehicle-mounted transponder associated with the transaction from other personal or vehicle-mounted transponders entering one or more of the transmission fields (block 434). If a response to an interrogation signal is received that does not correspond to the vehicle-mounted transponder associated with the transaction, the response is ignored (block 436).

Preferably, the control system will ignore all responses of customer-carried transponders in the top-mount or overhead transmission fields. Erroneous responses from other vehicles are rejected based on the control system recognizing a response from a vehicle-mounted transponder having a different identification indicia from the vehicle-mounted transponder associated with the ongoing transaction. During this time, the control system will continue with the transaction (block 438) until the transaction is completed (block 440).

If the transaction is not complete, the control system will continue to monitor for the presence of the vehicle-mounted transponder and any other transponders in the area (blocks 432–440). Once the transaction is complete (block 440), the process returns to the beginning (block 442). Although the preferred embodiment provides for mid and overhead transmission fields wherein transponder responses are received near the top or above the dispenser, those skilled in the art will recognize that numerous modifications of this configuration are within the inventive concept disclosed herein and subject to the claims that follow.

As noted, the interrogation communications system preferably communicates using substantially directional radio frequencies in conjunction with antennas configured to provide precisely shaped and directed interrogation fields. Communications at these frequencies are generally limited to line-of-sight communications wherein arranging the antennas to cover a common interrogation field from different locations avoids parallax and the effect of interference from objects coming between the transponder and one of the antennas. Generally, communications will require the absence of metal objects coming between the antennas and transponders. Thus, when antennas are mounted within the dispenser, glass or plastic dispenser walls are preferable. Furthermore, vehicle-mounted transponders are preferably placed on the windows or behind non-metal portions of the vehicle to avoid interference.

Preferably, high-gain antennas are used to provide a highly directional and configurable cone shape covering an area most likely to include a transponder when a vehicle is properly positioned for fueling. The antenna range and transmission power is typically adjusted to provide the desired interrogation field while minimizing the potential for the transponder to reflect signals to antennas associated with other fueling positions.

Another benefit provided by an embodiment of the present invention is that spread-spectrum communications limits the likelihood that an interrogator in the system will synchronize with a transponder being interrogated by another interrogator. Thus, a preferred embodiment of the present invention provides for a communications system capable of distinguishing between transponder types, limiting the potential of transponders erroneously communicating with another interrogator, simplifying communications by using the same carrier for transmission and reception, extending the interrogation field to more easily communicate with vehicle-mounted transponders, reducing the size of the antennas required for communication, and allowing either the same or same type of antenna to be used for transmission and reception.

Figure 13A:
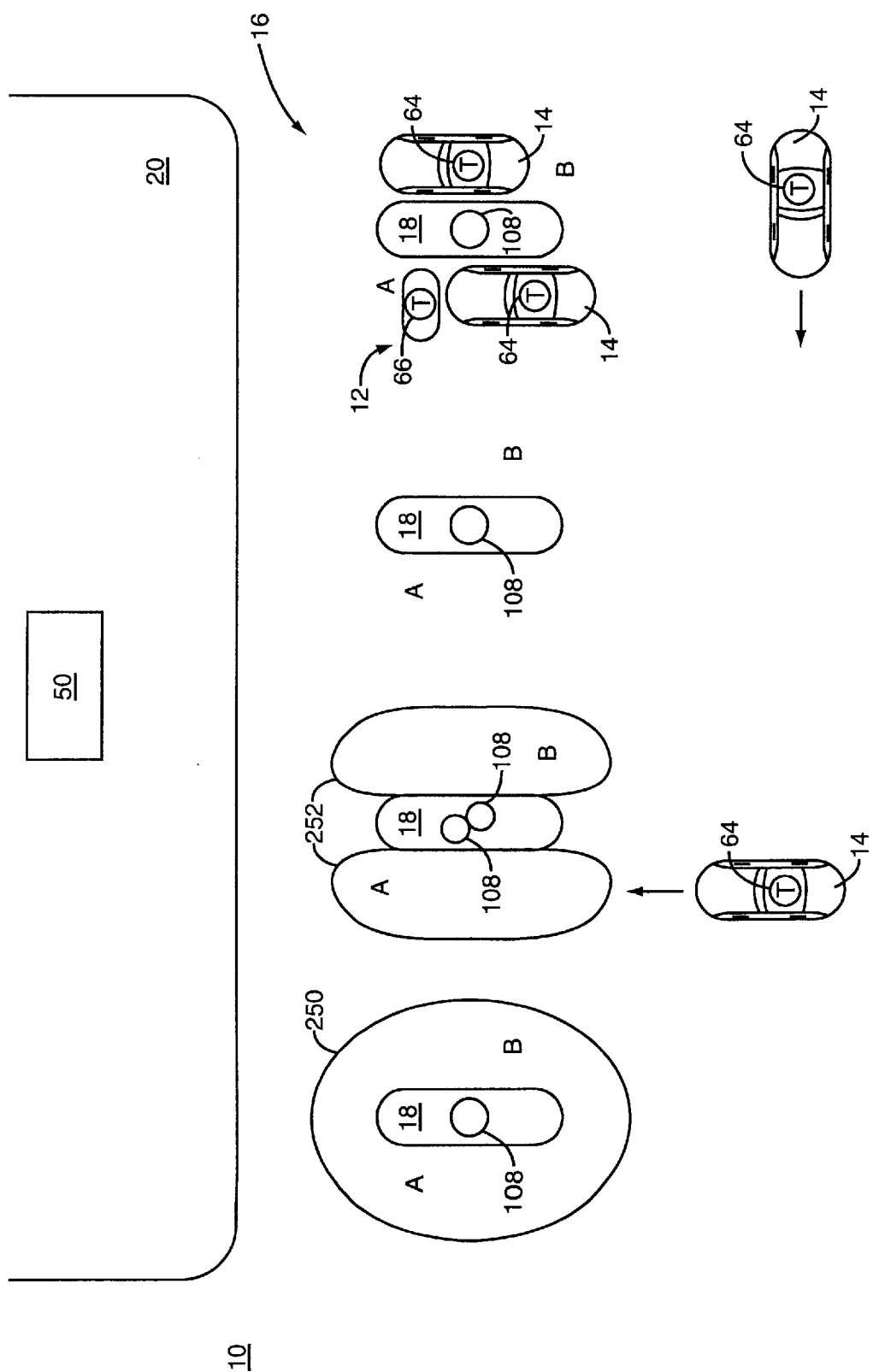
FIG. 13A is an overhead schematic representation of a fueling environment having antenna arrangements providing various interrogation fields.

Turning now to FIG. 13A, an alternative fueling environment 10 is shown having a station store 20 and the central control system 50 configured to communicate with each of the dispensers 18. Multiple vehicles 14 are depicted in and around the various fuel dispensers 18. Each of the dispensers may include an antenna 108. These antennas 108 may be operatively associated with a corresponding dispenser interrogator 52 and dispenser control system 80 (see FIG. 5). Please note that antenna placement will depend upon the application and may include placing the antennas anywhere in the fueling environment 10 separate from the dispensers 18. Placing the antennas at non-dispenser locations is especially operable in applications where the antennas are used to determine transponder location.

The antenna 108 and dispenser 18 configuration in FIG. 13A is specifically adapted to determine the proximity of a vehicle relative to a particular fueling position A, B associated with each dispenser 18. The different reception patterns are depicted in association with the two left most dispensers 18. The circular reception pattern 250 would be used to determine the proximity of a vehicle with respect to a particular dispenser 18. Generally, only one antenna 108 is required for such an embodiment. As a vehicle approaches the dispenser having the circular pattern 250, the dispenser's corresponding interrogator 52 and dispenser control system 80 will receive a signal transmitted from the transponder 12, 14. The dispenser control system 80 will analyze certain characteristics of the signal received from the transponder, such as magnitude or strength, to determine a relative proximity to the dispenser. Typically, a dispenser 18 having an antenna configuration providing the basic circular pattern 44 is not able to distinguish at which side or fueling position A, B, the vehicle is positioned.

Figure 16:
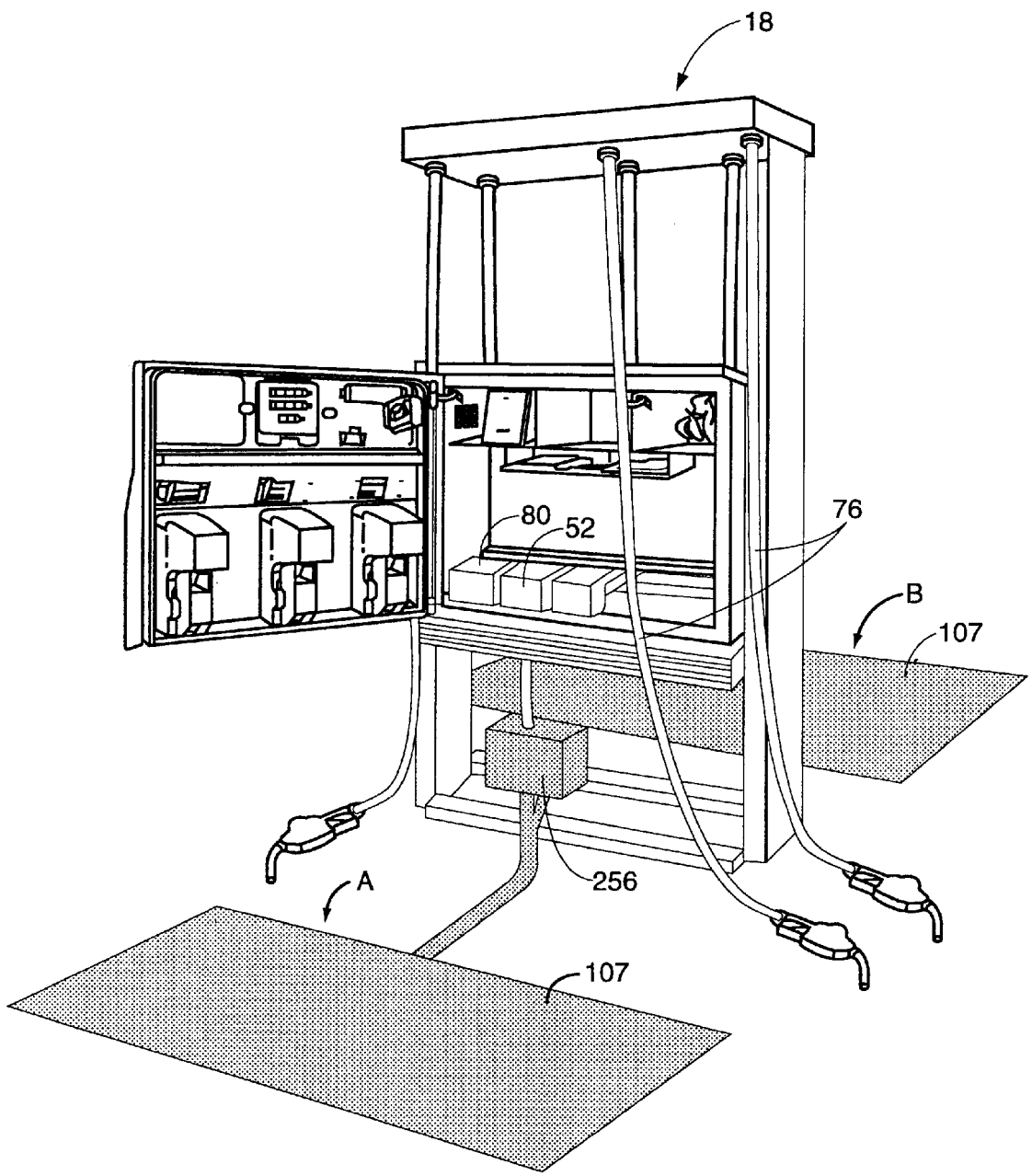
FIG. 16 is a perspective view of a fuel dispenser having underground antennas constructed according to the present invention.

A dual-lobed pattern 252 associated with the second dispenser 18 from the left in FIG. 13A provides the dispenser control system 80 the ability to determine at which fueling position A, B the vehicle is located or approaching. In order to determine the particular fueling position A, B, a directional component is necessary in addition to the proximity component described above. To provide this directional component, multiple antennas may be used to create various types of reception lobes where the antennas may be configured to only receive signals from certain pre-set directions or areas. Regardless of the configuration, the dispenser control system 80 will monitor a characteristic of the signal determinative of proximity, such as magnitude or strength, in conjunction with determining the fueling position A, B to which the signal appears most proximate. In the dual-lobed embodiment 252, the dispenser control system 80 may measure the signal characteristics received at both antennas 108 to determine from which antenna the received signal was strongest in order to determine direction. Using directionally configured antennas will allow each antenna to focus on one fueling position. Alternatively, placing the antennas 107 in the forecourt under each fueling position allows for easy determination of vehicle placement relative to a fueling position as shown in FIG. 16.

The dispenser control system 80 may include electronics capable of detecting signal strength or magnitude and monitor for variations therein. The magnitude monitoring circuitry 256 preferably includes automatic gain control electronics feeding the received signal into an analog-to-digital converter. Signal strength is turned into an 8-bit digital string corresponding to a signal magnitude. The dispenser control system 80 will monitor the string for variations in signal strength. As the signal magnitude increases, the dispenser control system 80 will determine that the transponder is approaching, and vice versa.

Figure 14A:
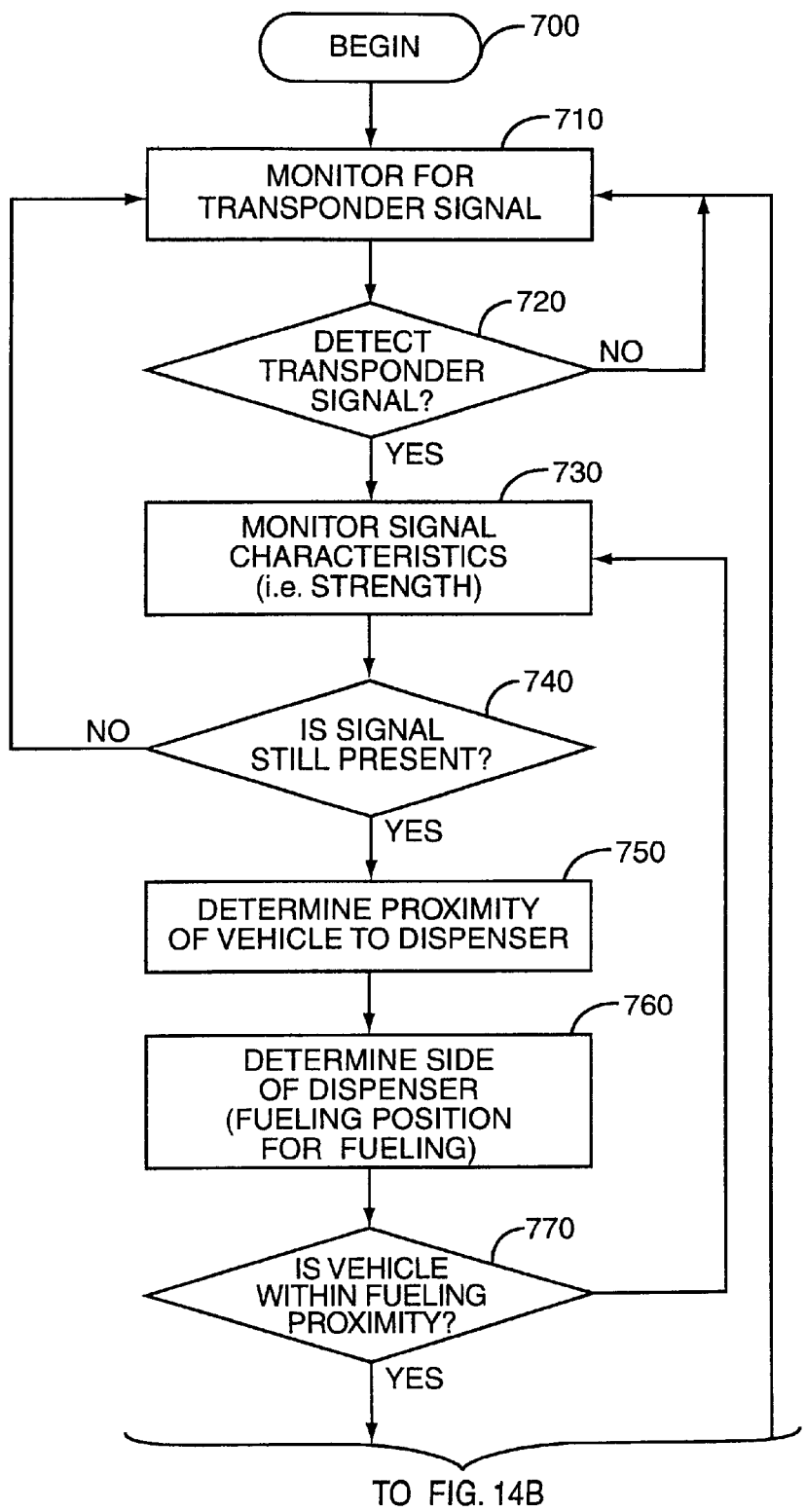
FIGS. 14A and 14B are a flow chart of a basic process for determining the proximity or location of a transponder with respect to a particular fueling position at a dispenser according to the present invention.
Figure 14B:
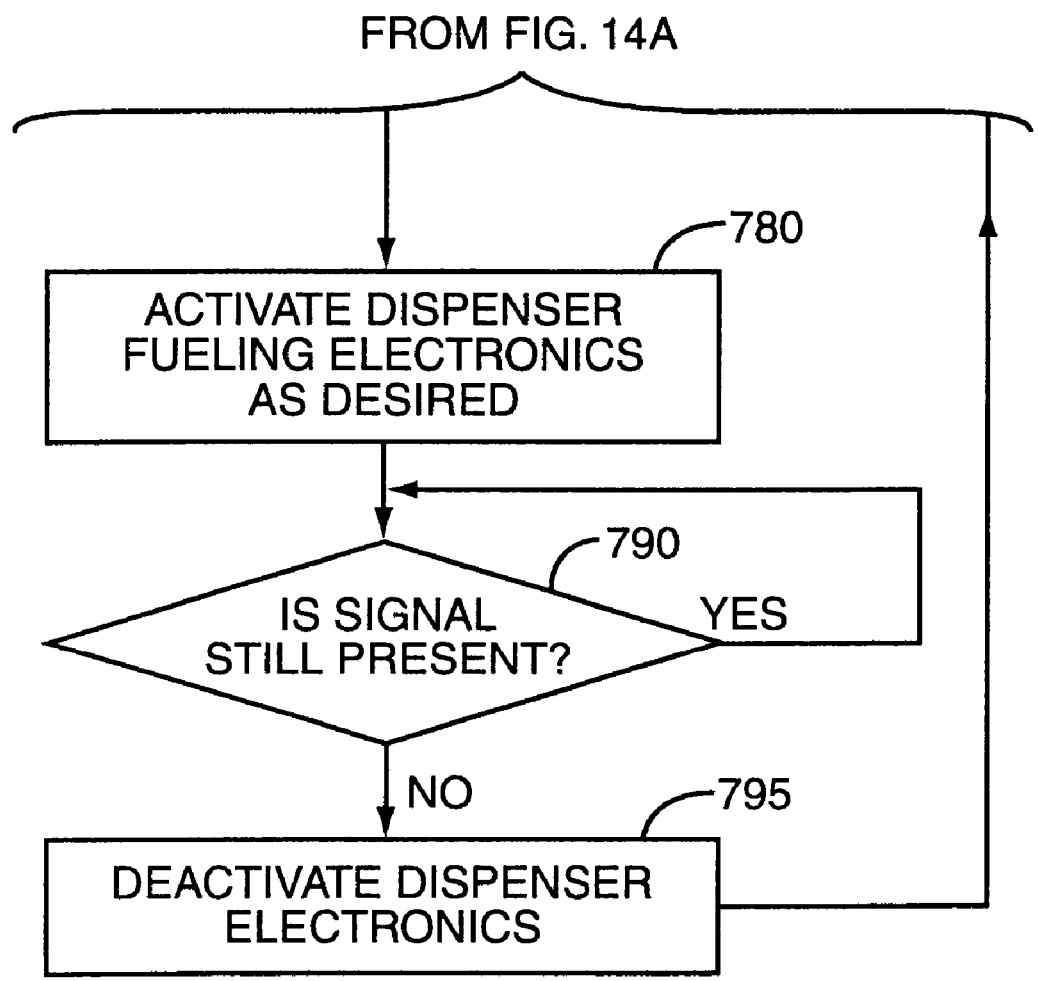

The flow chart of FIGS. 14A and 14B outlines the process undertaken by the dispenser control system 80 to determine the proximity or location of a transponder 64, 66 with respect to a particular fueling position A, B of a dispenser 18. The process begins (block 700) with the dispenser control system 80 beginning to monitor for a transponder signal (block 710). The signal may originate from an active transmitter in the transponder or may reflect or scatter back to a dispenser interrogator 52 and antenna 108. Upon detection of a transponder signal (block 720), the dispenser control system 80 will monitor a characteristic, such as magnitude or phase of the signal (block 730). At this point, the dispenser control system 80 recognizes a transponder 64, 66 as near or approaching the dispenser 18 and continues to monitor for the presence of the signal (block 740). If the signal is lost or decreases, the dispenser control system 80 will determine that the transponder has left or is leaving the reception area and will begin to monitor for a new transponder signal (block 710). If the signal remains present and/or increases, the dispenser control system 80 will determine the proximity of the vehicle with respect to the dispenser (block 750). Preferably, the dispenser control system 80 will monitor to determine whether or not the signal strength is changing to ensure that the vehicle-mounted transponder 64 does not move during the fueling operation.

In order to determine the particular fueling position A, B at which the transponder is located, the dispenser control system 80 must determine which side of the dispenser the vehicle is at or approaching (block 760). The dispenser control system 80 may simply monitor the signal with antennas at or near the particular fueling position designed to receive using a directionally sensitive antenna configuration, such as the embodiment of FIGS. 12A and 12B, the dual-lobed configuration 252 of FIG. 13A, or the underground antennas 107 shown in FIG. 16.

Reference is again directed to FIGS. 14A and 14B. As a transponder approaches a particular fueling position A, B, the dispenser control system 80 determines if the transponder is within a certain fueling proximity (block 770). When the vehicle is within fueling proximity, it is in a position close enough for the fuel dispenser 18 at the corresponding fueling position A, B to allow fueling of the vehicle. If the vehicle is not within fueling proximity, the dispenser control system 80 continues to monitor the strength and direction of the signal (blocks 730–760). The dispenser control system 80 may determine whether the transponder or vehicle is within fueling proximity by simply receiving the transponder signal, receiving a signal magnitude above a predefined threshold, and/or determining whether the signal magnitude is changing, indicating that the transponder and vehicle are moving.

Once the vehicle is in position for fueling, the dispenser control system 80 activates the dispenser's fueling electronics as desired (block 780). During the fueling operation, the dispenser control system 80 continues to monitor for the presence of a signal in decision block 790. When the signal is no longer present, the dispenser electronics are deactivated at block 795, and the dispenser control system 80 monitors for the next transponder signal at block 710 causing the process to repeat.

Figure 13B:
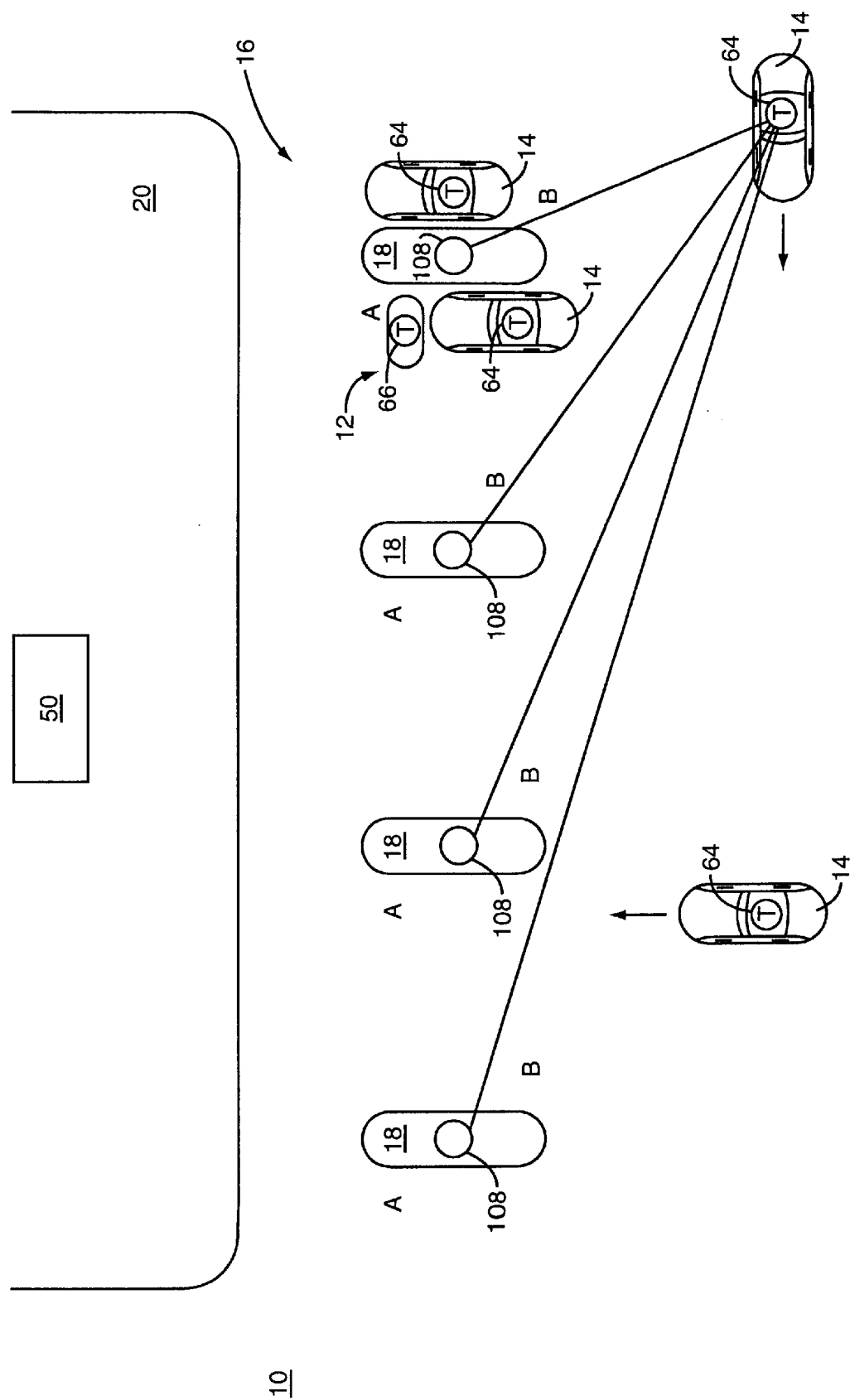
FIG. 13B is an overhead schematic representation of a fueling environment having antenna arrangements providing continuous location monitoring of transponders in the fueling environment.

FIG. 13B depicts an embodiment wherein the location of transponders may be tracked as they travel throughout the service station environment 10. In this embodiment, the dispensers 18 each include an antenna 108 capable of receiving a signal from a transponder 64. Preferably, signals from the antennas 108 are multiplexed together at the central control system 50. The various control systems will receive the transponder signal and monitor the location of the vehicle and determine the dispenser 18 and fueling position A, B at which the vehicle stops. The dispenser control system 80 may, for example, monitor a characteristic, such as the phase, of the signal received by the various antennas 108 associated with the dispensers 18 and use known computational techniques, based on the signal characteristics received at the various antenna locations, to determine vehicle location. One such technique using phase differences is triangulation.

Although the signal of only one vehicle transponder 64 is depicted, the various dispensers 18 and/or the central control system 50 may monitor for the presence and location of a plurality of vehicles to determine proximity, direction of travel and location throughout the fueling environment 10. Triangulation and other similar positioning and locating techniques generally require at least two antennas and provide better resolution as the number of antennas 108 increase. The location of the respective antennas 108 may be virtually anywhere in the fueling environment 10. Another alternative to multiplexing the various antennas located at the respective dispensers 18 or elsewhere in the fueling environment 10 is to use multiple antennas in each dispenser or throughout the fueling environment 10. Additionally, a global positioning system (GPS) could be used to communicate vehicle position directly or through a remote network 94 to the central control system 50 and on to the fuel dispenser 18.

Figure 15:
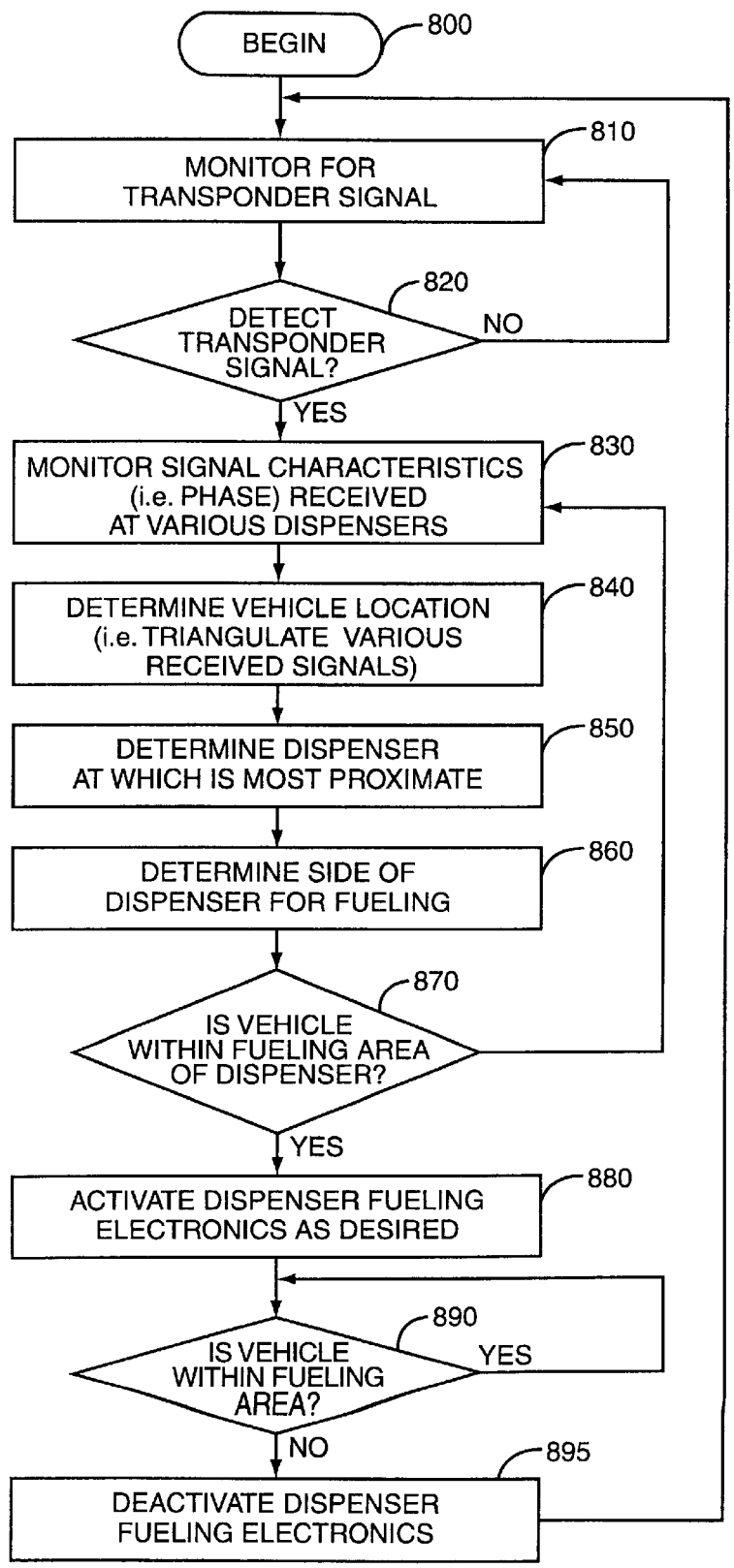
FIG. 15 is a flow chart of a basic control process for determining transponder location for an embodiment similar to that depicted in FIG. 13B.

The flow chart of FIG. 15 outlines the control process for the embodiment depicted in FIG. 13B. The process begins (block 800) and initially monitors for the presence of a transponder signal (block 810). Once the signal is received (block 820), the dispenser control system 80 monitors the characteristics of the signal for various antennas (block 830). The dispenser control system 80 will next determine the location of the transponder (block 840) using the monitored signal characteristics at the various antennas to triangulate or otherwise determine vehicle location. The precise fueling position A, B of the corresponding dispenser 18 is determined (blocks 850 and 860) by calculating the position at which the vehicle stopped. The dispenser control system 80 for the dispenser where the vehicle stopped will determine if the vehicle is within the fueling area (block 870). If the vehicle is within the fueling area, the dispenser's fueling electronics are activated as desired (block 880). The dispenser control system 80 will continually monitor the location of the vehicle to determine if the vehicle remains within the fueling area (block 890). Once the fueling operation is over and the vehicle leaves the fueling area, the dispenser control system 80 deactivates the dispenser's fueling electronics (block 895) and monitors for a new transponder signal (block 810), whereupon the process is repeated.

With respect to FIG. 16, an embodiment depicting underground antennas 107 is shown. The two antennas 107 correspond to fueling positions A and B. The antennas are preferably multiplexed at an antenna multiplexer 256. The multiplexer 256 sends the multiplex signals received by the corresponding antenna 107 to the interrogator 52. Preferably, intrinsically safe barriers are used to provide electrical isolation between the antennas and the multiplexer 256 and/or interrogator 52.

The various flow charts and processes disclosed herein generally represent programs which are stored in memory and run on an associated controller. Given the shared control responsibilities between the dispenser control systems and the central control system in a typical fueling environment, the control systems defined in the claims that follow are to be construed as including control features provided by dispenser control systems, central control systems and remote network control systems, alone or in combination. Those skilled in the art will recognize the tremendous flexibility in providing the various control aspects throughout the numerous control systems (including remote networks) in and outside of the fueling environment.

Certain modifications and improvements will occur to those skilled in the art upon a reading of the foregoing description. It should be understood that all such modifications and improvements have been deleted herein for the sake of conciseness and readability, but are properly within the scope of the following claims.

What is claimed is:

1. A fuel delivery system capable of controlling a fuel dispenser's vapor recovery system comprising:
    a. a fuel dispenser having a vapor recovery system adapted to retrieve fuel vapor expelled from a fuel tank of a vehicle;
    b. a control system associated with said vapor recovery system;
    c. communication electronics associated with said control system and adapted to communication with a remote communication unit of the vehicle; and
    d. said control system adapted to retrieve indicia from the remote communication unit and control said vapor recovery system based on the indicia.

2. The system of claim 1 wherein the indicia represents the vehicle is equipped with an onboard vapor recovery system and said control system is further adapted to determine the presence of an onboard vapor recovery system based on the received indicia and control said vapor recovery system accordingly.

3. The system of claim 2 wherein the indicia further represents the vehicle has a fuel tank with a fill neck of a type forming a mechanical seal during fuel delivery.

4. The system of claim 3 wherein said control system is adapted to activate the vapor recovery system.

5. The system of claim 2 wherein the indicia further represents the vehicle has a fuel tank with a fill neck of a type forming a liquid seal during fuel delivery.

6. The system of claim 5 wherein said indicia further represents the fuel tank is of a type having a recirculation path between the fill neck and the fuel tank for vapor flow for onboard vapor recovery during fueling.

7. The system of claim 6 wherein said control system is adapted to lower a vapor recovery flow rate from a nominal recovery flow rate.

8. The system of claim 6 wherein said control system is adapted to lower a vapor recovery flow rate to less than around about fifty percent of a nominal vapor recovery flow rate.

9. The system of claim 6 wherein said control system is adapted to lower a vapor recovery flow rate to around about fifty percent of a nominal vapor recovery flow rate.

10. The system of claim 5 wherein said indicia further represents the fuel tank is of a type not having a recirculation path between the fill neck and the fuel tank for vapor flow for onboard vapor recovery during fueling.

11. The system of claim 10 wherein said control system is adapted to prevent operation of said vapor recovery system.

12. The system of claim 10 wherein said control system is adapted to lower a vapor recovery flow rate to less than around about fifty percent of a nominal vapor recovery flow rate.

13. The system of claim 10 wherein said control system is adapted to lower a vapor recovery flow rate to less than around about thirty percent of a nominal vapor recovery flow rate.

14. The system of claim 2 wherein said control system is adapted to prevent operation of said vapor recovery system.

15. The system of claim 1 wherein said indicia represents the vehicle is equipped with a defined type of fuel tank and said control system is further adapted to determine the type of fuel tank based on the received indicia and control said vapor recovery system accordingly.

16. The system of claim 15 wherein said indicia represents the vehicle is equipped with a defined type of fill neck for the fuel tank and said control system is further adapted to determine the type of fill neck based on the received indicia and control said vapor recovery system accordingly.

17. The system of claim 1 wherein said indicia represents a type of vehicle having a known type of fuel tank and said control system is further adapted to determine the type of vehicle based on the received indicia and control said vapor recovery system accordingly.

18. The system of claim 1 wherein said indicia represents the vehicle is equipped with a fuel tank having a certain vent tube placement in the fill neck and said control system is further adapted to determine the vent tube placement based on the received indicia and control said vapor recovery system accordingly.

19. The system of claim 18 wherein said indicia further represents the vent tube communicates with the fill neck outside of a restrictor plate and said control system is further adapted to determine the vent tube is outside of the restrictor plate and control said vapor recovery system accordingly.

20. The system of claim 19 wherein said control system is adapted to operate said vapor recovery system at a vapor recovery flow rate greater than a flow rate operated at when the vent tube communicates with the fill neck inside the restrictor plate.

21. The system of claim 18 wherein said indicia further represents the vent tube communicates with the fill neck inside a restrictor plate and said control system is further adapted to determine the vent tube is inside the restrictor plate and control said vapor recovery system accordingly.

22. The system of claim 21 wherein said control system is adapted to operate said vapor recovery system at a vapor recovery flow rate less than a flow rate operated at when the vent tube communicates with the fill neck outside the restrictor plate.

23. The system of claim 1 wherein said vapor recovery system is adapted to provide a variable flow rate and said control system is adapted to control the flow rate of said vapor recovery system.

24. The system of claim 23 wherein said indicia represents a vapor recovery function for a fuel tank of the vehicle and said control system is further adapted to determine a vapor recovery function and control the flow rate of said vapor recovery system according to the vapor recovery function for the fuel tank of the vehicle.

25. The system of claim 24 wherein the function is a constant.

26. The system of claim 24 wherein the function is linear.

27. The system of claim 24 wherein the function is nonlinear.

28. The system of claim 24 wherein the function provides for a first flow rate at an initiation of fueling and decreases the flow rate from the first flow rate.

29. The system of claim 24 wherein the function is dependent on an amount of fuel delivered to the fuel tank.

30. The system of claim 24 wherein the function is dependent on a volume of fuel delivered.

31. The system of claim 24 wherein the function is dependent on time.

32. The system of claim 24 wherein the indicia represents ullage of the tank and the function is dependent on ullage.

33. The system of claim 24 wherein the indicia represents pressure in the tank and the function is dependent on the pressure.

34. The system of claim 24 wherein the indicia represents temperature of fuel in the tank and the function is dependent on the temperature of the fuel.

35. The system of claim 24 wherein said system further includes a vapor recovery path and a hydrocarbon sensor located in said vapor recovery path, said control system is adapted to monitor hydrocarbon concentrations in the vapor recovery path and the function is dependent on the hydrocarbon concentrations.

36. The system of claim 24 wherein the function is dependent on the vapor pressure of a fuel being delivered to the vehicle.

37. The system of claim 24 wherein said control system uses said indicia from the remote communications unit to access additional information required for vapor recovery control.

38. The system of claim 1 wherein the indicia represents the vehicle is not equipped with an onboard vapor recovery system and said control system is further adapted to determine the absence of an onboard vapor recovery system based on the received indicia and control said vapor recovery system accordingly.

39. The system of claim 1 wherein said vapor recovery system includes a vapor return line and a variable speed vapor pump for controlling the rate of flow in the vapor return line.

40. The system of claim 1 wherein the indicia further represents the vehicle is equipped with an onboard vapor recovery system and said control system is further adapted to determine the presence of an onboard vapor recovery system based on the received indicia and control said vapor recovery system accordingly.

41. A fuel delivery system capable of controlling a fuel dispenser's vapor recovery system comprising:
   a. a fuel dispenser having a vapor recovery system adapted to retrieve fuel vapor expelled from a fuel tank of a variable flow rate;
   b. a control system associated with said vapor recovery system and adapted to control the flow rate of said recovery system; and
   c. communication electronics associated with said control system and adapted to communication with a remote communication unit of the vehicle and
   d. said control system adapted to receive indicia from the remote communication unit representing a vapor recovery function for a fuel tank of the vehicle and control the flow rate of said vapor recovery system according to the vapor recovery function for the fuel tank of the vehicle.

42. A fuel delivery system capable of controlling a fuel dispenser's vapor recovery system comprising:
   a. a fuel dispenser having a vapor recovery system adapted to retrieve fuel vapor expelled from a fuel tank of a vehicle at a variable flow rate;
   b. a control system associated with said vapor recovery system and adapted to control the flow rate of said vapor recovery system; and
   c. communication electronics associated with said control system and adapted to communication with a remote communication unit of the vehicle; and
   d. said control system adapted to
      i. receive indicia from the remote communication unit representing a vapor recovery function for a fuel tank of the vehicle and control the flow rate of said vapor recovery system according to the vapor recovery function for the fuel tank of the vehicle, and
      ii. receive indicia from the remote communication unit representing the presence of an onboard vapor recovery system if the vehicle is equipped with an onboard vapor recovery system and control said vapor recovery system accordingly.

43. The system of claim 42 wherein said control system is adapted to control the vapor recovery system differently depending on a type of onboard vapor recovery system determined, and the indicia represents the type of onboard vapor recovery system if an onboard vapor recovery system is available.

44. The system of claim 42 wherein said control system is adapted to prevent operation of said vapor recovery system for a first type of onboard vapor recovery system, and the indicia represents the type of onboard vapor recovery system if an onboard vapor recovery system is available.

45. The system of claim 44 wherein said control system is adapted to reduce the flow rate of said vapor recovery system for a second type of onboard vapor recovery system, and the indicia represents the type of onboard vapor recovery system if an onboard vapor recovery system is available.

46. The system of claim 44 wherein said control system is adapted to activate the flow rate of said vapor recovery system for a second type of onboard vapor recovery system, and the indicia represents the type of onboard vapor recovery system if an onboard vapor recovery system is available.

47. The system of claim 42 wherein said control system is adapted to reduce the flow rate of said vapor recovery system for a second type of onboard vapor recovery system, and the indicia represents the type of onboard vapor recovery system if an onboard vapor recovery system is available.

48. The system of claim 42 wherein said control system is adapted to activate the flow rate of said vapor recovery system for a second type of onboard vapor recovery system, and the indicia represents the type of onboard vapor recovery system if an onboard vapor recovery system is available.

49. A fuel delivery system capable of controlling a fuel dispenser's vapor recovery system comprising:
   a. a fuel dispenser having a vapor recovery system adapted to retrieve fuel vapor expelled from a fuel tank of a vehicle at a variable flow rate;
   b. a control system associated with said vapor recovery system and adapted to control the flow rate of said vapor recovery system; and
   c. an interrogator associated with said control system and adapted to interrogate a transponder of the vehicle; and
   d. said control system adapted to receive indicia from the transponder representing a vapor recovery indicia for a fuel tank of the vehicle and control the flow rate of said vapor recovery system according to the vapor recovery indicia for the fuel tank of the vehicle.

50. A method of controlling a fuel dispenser's vapor recovery system comprising:
   a. receiving indicia from a remote communications unit of a vehicle; and
   b. controlling a vapor recovery system based on the indicia received from the remote communication unit.

51. A method of controlling a fuel dispenser's vapor recovery system comprising:
   a. receiving indicia from the remote communication unit of a vehicle representing a vapor recovery function for a fuel tank of the vehicle if the vehicle is not an onboard vapor recovery equipped vehicle;
   b. receiving indicia from the remote communication unit of a vehicle representing the presence of an onboard vapor recovery system if the vehicle is equipped with an onboard vapor recovery system; and
   c. controlling the flow rate of the vapor recovery system according to the vapor recovery function for the fuel tank of the vehicle if the vehicle is not an onboard vapor recovery equipped vehicle and controlling the vapor recovery system accordingly if the vehicle is equipped with an onboard vapor recovery system.

* * * * *